United States Patent
Landau et al.

(10) Patent No.: US 9,522,386 B2
(45) Date of Patent: Dec. 20, 2016

(54) CATALYST AND A PROCESS FOR CATALYTIC CONVERSION OF CARBON DIOXIDE-CONTAINING GAS AND HYDROGEN STREAMS TO HYDROCARBONS

(71) Applicant: B.G. NEGEV TECHNOLOGIES AND APPLICATIONS LTD., at BEN-GURION UNIVERSITY, Beer-Sheva (IL)

(72) Inventors: Miron Landau, Beer-Sheva (IL); Mordechai Herskowitz, Beer-sheva (IL); Roksana Vidruk, Beer-Sheva (IL)

(73) Assignee: B.G. NEGEV TECHNOLOGIES AND APPLICATIONS LTD. AT BEN-GURION UNIVERSITY, Beer-Sheva (IL)

( * ) Notice: Subject to any disclaimer, the term of this patent is extended or adjusted under 35 U.S.C. 154(b) by 0 days.

(21) Appl. No.: 14/801,292

(22) Filed: Jul. 16, 2015

(65) Prior Publication Data
US 2016/0038919 A1 Feb. 11, 2016

Related U.S. Application Data

(63) Continuation-in-part of application No. PCT/IL2014/000006, filed on Jan. 16, 2014.

(60) Provisional application No. 61/753,448, filed on Jan. 17, 2013, provisional application No. 62/027,788, filed on Jul. 23, 2014.

(51) Int. Cl.
| | |
|---|---|
| *B01J 23/70* | (2006.01) |
| *B01J 23/58* | (2006.01) |
| *B01J 23/745* | (2006.01) |
| *B01J 23/00* | (2006.01) |
| *B01J 23/78* | (2006.01) |
| *C10G 2/00* | (2006.01) |
| *B01J 37/03* | (2006.01) |
| *B01J 37/18* | (2006.01) |
| *B01J 27/22* | (2006.01) |
| *B01J 37/02* | (2006.01) |
| *B01J 37/08* | (2006.01) |
| *B01J 35/00* | (2006.01) |
| *B01J 35/10* | (2006.01) |
| *B01J 37/00* | (2006.01) |

(52) U.S. Cl.
CPC ............ *B01J 23/745* (2013.01); *B01J 23/005* (2013.01); *B01J 23/78* (2013.01); *B01J 27/22* (2013.01); *B01J 37/0201* (2013.01); *B01J 37/03* (2013.01); *B01J 37/18* (2013.01); *C10G 2/332* (2013.01); *C10G 2/50* (2013.01); *B01J 35/006* (2013.01); *B01J 35/1014* (2013.01); *B01J 35/1019* (2013.01); *B01J 35/1038* (2013.01); *B01J 35/1061* (2013.01); *B01J 37/0009* (2013.01); *B01J 37/08* (2013.01); *B01J 2523/00* (2013.01)

(58) Field of Classification Search
CPC ........... B01J 23/005; B01J 23/78; B01J 37/18; B01J 2523/00; B01J 25/1061; B01J 35/1019; B01J 2523/13; B01J 2523/31; B01J 2523/842; C10G 2/50; C10G 2/232
USPC ................................................. 502/336, 330
See application file for complete search history.

(56) References Cited

U.S. PATENT DOCUMENTS

| | | |
|---|---|---|
| 2,692,274 A | 10/1954 | Kölbel et al. |
| 4,555,526 A | 11/1985 | Wakui et al. |
| 5,140,049 A | 8/1992 | Fiato et al. |

FOREIGN PATENT DOCUMENTS

| | | |
|---|---|---|
| JP | 2011-045840 | 3/2011 |
| WO | WO 97/05088 | 2/1997 |
| WO | WO 01/34538 | 5/2001 |

OTHER PUBLICATIONS

Aasberg-Petersen et al., "Recent developments in autothermal reforming and pre-reforming for synthesis gas production in GTL applications," *Fuel Processing Technology*, 2003, vol. 83, pp. 253-261.
Baliban et al., "Biomass to liquid transportation fuels (BTL) systems: process synthesis and global optimization framework," *Energy & Environmental Science*, 2013, vol. 6, pp. 267-287.
Barrett et al., The Determination of Pore Volume and Area Distributions in Porous Substances. I. Computations from Nitrogen Isotherms, *Journal of American Chemical Society*, Jan. 1951, vol. 73, pp. 373-380.
Basini et al., "Reduction on Synthesis Gas Costs by Decrease of Steam/Carbon and Oxygen/Carbon Ratios in the Feedstock," *Ind. Eng. Chem. Res.*, 1998, vol. 37, No. 1, pp. 258-266.
De Klerk., "Fischer-Tropsch fuels refinery design," *Energy & Environmental Science*, 2011, vol. 4, pp. 1177-1205.
Hong et al., "Deactivation study on a coprecipitated Fe—Cu—K—Al catalyst in a $CO_2$ hydrogenation," *Applied Catalysis A*: General, 2001, vol. 218, pp. 53-59.
Kohn et al., "Auto-thermal and dry reforming of landfill gas over a Rh/γAl$_2$O$_3$ monolith catalyst," *Applied Catalysis B*: Environmental, 2010, vol. 94, pp. 125-133.
International Search Report for PCT/IL2014/000006, mailed Sep. 15, 2014, 6 pages.

(Continued)

*Primary Examiner* — Jafar Parsa
(74) *Attorney, Agent, or Firm* — Nixon & Vanderhye P.C.

(57) ABSTRACT

The invention relates to a catalyst suitable for use in the hydrogenation of carbon dioxide-containing gas, said catalyst comprising spinel phase of the formula $[Fe^{2+}(Fe^{3+}{}_{y}Al^{3+}{}_{1-y})_2O_4]$. Processes for preparing the catalyst and processes for the hydrogenation of carbon dioxide-containing gas in the presence of the catalyst are also disclosed.

4 Claims, 5 Drawing Sheets
(1 of 5 Drawing Sheet(s) Filed in Color)

(56) References Cited

OTHER PUBLICATIONS

Written Opinion of the ISA for PCT/IL2014/000006, mailed Sep. 15, 2014, 12 pages.
B.D. Roiter: "Phase Equilibria in the Spinel Region of the System FeO—$Fe_2O_3$—$Al_2O_3$", Journal of the American Ceramic Society, Oct. 1964, vol. 47, No. 10, pp. 509-511.
J.W. Halloran et al: "Iron Diffusion in Iron-Aluminate Spinels", Journal of the American Ceramic Society, vol. 63, No. 1-2, 1980, pp. 58-65.
T.V. Reshetenko et al: "Coprecipitated Iron-Containing Catalysts (Fe—$Al_2O_3$, Fe—Co—$Al_2O_3$, Fe—Ni—$Al_2O_3$) for Methane Decomposition at Moderate Temperatures I. Genesis of Calcined and Reduced Catalsts", Applied Catalysis A: General, vol. 268, No. 1-2, Aug. 10, 2004, pp. 127-138.
M. E. Dry et al: "The Distribution of Promoters in Magnetite Catalysts", Journal of Catalysis, vol. 7, No. 4, Apr. 1, 1967, pp. 352-358.
A. M. Rubenshtein et al: "Extensive Study of the Iron Catalysts of Ammonia Synthesis. II Structure and Texture of Twice Promoted Precipitated Catalysts", Kinetika I Kataliz, vol. 6, No. 2, Apr. 1965, pp. 243-249.
T. Riedel et al: "Fischer-Tropsch on Iron with $H_2$/CO and $H_2$/$CO_2$ as Synthesis Gases: the Episodes of Formation of the Fischer-Tropsch Regime and Construction of the Catalyst", Topics in Catalysis, vol. 26, Nos. 1-4 pp. 41-54, Dec. 2003.
J.S. Kim et al: "Performance of Catalytic Reactors for the Hydrogenation of $CO_2$ to Hydrocarbons", Catalysis Today, vol. 115, No. 1-4, Jun. 30, 2006, pp. 228-234.
M. Landau et al: "Sustainable Production of Green Feed from Carbon Dioxide and Hydrogen", Chemsuschem, vol. 7, No. 3, Feb. 23, 2014, pp. 785-794.
Basini et al: "Reduction on systhesis . . . feedstock", Ind. Eng. Chem. Res. 1998.37, 258-266.
Assberg-Petersen et al: "Recent developments in . . . applications", Fuel Processing Technology 83, 2003, 253-261.
M.P. Kohn et al: "Auto-thermal and dry reforming . . . catalyst", Applied Catalysis B: Environmental 94, 2010, 125-133.
Baliban et al: "Biomass to liquid . . . framework", Energy Environ. Sci., 2013, 6, 267-287.
de Klerk, Energy Environ. Sci., 2011, 4, 1177.
Barrett-Joyner-Halenda method, Journal of American Chemical Society, 73, 373, 1951.
J.S. Hong et.al. [Applied Catalysis A, 218, 53-59, 2001].

CATALYST AND A PROCESS FOR CATALYTIC CONVERSION OF CARBON DIOXIDE-CONTAINING GAS AND HYDROGEN STREAMS TO HYDROCARBONS

This application is a Continuation-in-Part of International Application No. PCT/IL2014/000006 filed 16 Jan. 2014 which designated the U.S. and claims the benefit of U.S. Provisional Application No. 61/753,448 filed 17 Jan. 2013, and U.S. Provisional Application No. 62/027,788 filed 23 Jul. 2014, the entire contents of each of which are hereby incorporated by reference.

Land, air and marine transportation relies almost entirely on the availability of petroleum-derived liquid fuels. Given the limited availability of crude oil and the locations of the oil-producing countries, this dependence poses major security, economic, and environmental problems for the Western world.

Alternative routes for the production of synthetic liquid fuel from sources other than crude oil may be divided into three groups:
(i) conversion of coal and natural gas by a two-stage process, i.e., gasification to syngas (a mixture of CO and $H_2$), followed by Fischer-Tropsch (FT) synthesis;
(ii) conversion of biomass (cellulose, starch and lipids) by a wide variety of processes; and
(iii) conversion of carbon dioxide and water.

Among the three groups of conversion processes described above, the group using the most basic raw materials—carbon dioxide and water—is definitely the most attractive long-term alternative, with two main routes currently being explored with the aim of establishing the most viable process: artificial photosynthesis through photocatalytic and photoelectrochemical processes and water splitting combined with carbon dioxide hydrogenation. The development of the latter route is at a more advanced level, since both stages of the process have been successfully demonstrated at the bench scale.

Of the other two processes, those based on syngas are the most highly developed. Synthetic fuels have been produced for the past ninety years from coal and natural gas through a highly endothermic gasification process to syngas, followed by a highly exothermic FT process to produce paraffin mixtures, which are then further processed to a variety of final products.

Splitting of water generates hydrogen and oxygen. Oxygen can be combined with natural gas and steam to produce syngas that contains carbon monoxide, carbon dioxide and hydrogen by a process called autothermal reforming (L. Basini and L. Piovesan, "Reduction on Synthesis Gas Costs by Decrease of Steam/Carbon and Oxygen/Carbon Ratios in the Feedstock", Ind. Eng. Chem. Res. 1998, 37, 258-266; Kim Aasberg-Petersen, Thomas S. Christensen, Charlotte Stub Nielsen, Ib Dybkjaer, "Recent developments in auto-thermal reforming and pre-reforming for synthesis gas production in GTL applications", Fuel Processing Technology 83 (2003) 253-261). A similar process could be conducted with bio-gas instead of natural gas (McKenzie P. Kohn, Marco J. Castaldi, Robert J. Farrauto, "Auto-thermal and dry reforming of landfill gas over a Rh/γ-$Al_2O_3$ monolith catalyst", Applied Catalysis B: Environmental 94 (2010) 125-133). Gasification is another option for converting biomass with oxygen to syngas (Richard C. Baliban, Josephine A. Elia and Christodoulos A. Floudas, "Biomass to liquid transportation fuels (BTL) systems: process synthesis and global optimization framework", Energy Environ. Sci., 2013, 6, 267-287). The syngas produced by all those methods is mixed with hydrogen produced by electrolysis and carbon dioxide from an external source to form a mixture of carbon dioxide, carbon monoxide and hydrogen that is reacted on tubular reactor packed with solid catalyst to generate an organic liquid and a gas that contain hydrocarbons and water containing oxygenates as a by-product.

While dealing extensively with the conversion to hydrocarbons of syngas (a mixture of CO and hydrogen that may contain some $CO_2$) via the Fischer-Tropsch synthesis, considerably lesser amount of work is reported in the art in respect of $CO_2$ hydrogenation. The feasibility of a process of carbon dioxide hydrogenation to form liquid fuels depends on the performance of the catalyst used to advance the reaction and on other process variables.

U.S. Pat. No. 2,692,274 describes the catalytic reduction of carbon dioxide with hydrogen in the presence of iron oxide which contains 0.5% of copper and 0.8% K.

U.S. Pat. No. 5,140,049 discloses a method for producing olefins from $H_2$ and $CO_2$ using potassium promoted catalysts of the $Fe_3O_4$/2% K and $Fe_{2.85}CO_{0.15}O_4$/2% K.

A series of catalysts based on iron and potassium supported on alumina, which optionally contain also copper, i.e., catalysts of the formulas Fe—K/$Al_2O_3$ and Fe—K—Cu/$Al_2O_3$ were reported in U.S. Pat. No. 4,555,526, WO 97/05088 and WO 01/34538.

J. S. Hong et. al. [Applied Catalysis A, 218, 53-59, 2001] reported the synthesis of Fe—Al—Cu—K catalyst, its in-situ activation by means of hydrogen reduction at 450° C., followed by cooling down to 300° C., at which temperature the reaction was allowed to start in a continuous fixed bed reactor, into which $CO_2$:$H_2$ (1:3) streams were fed. After activation and stabilization at reaction conditions the catalyst contained two phases—iron oxide $Fe_3O_4$ and carbide $Fe_5C_2$. The best $CO_2$ conversion reported by these authors was around 40%.

Riedel et al. [Topics in Catalysis, Vol. 26, p. 41-54 (2003)] report the synthesis of Fe—Al—Cu—K catalyst by the quick addition of an aqueous $NH_3$ solution to a hot nitrate solution of iron, aluminum and copper. The precipitate was separated, washed and dried, and then impregnated with aqueous solution of potassium carbonate.

Non-stoichimetric, copper-containing spinel based on Fe—Al—O system was reported by Tanaka et. al. as being useful for exhaust gas treatment (JP 2011045840).

It has now been found that liquid fuels can be prepared with high productivity by a reaction of carbon dioxide with hydrogen on solid porous catalyst based on iron. The preferred catalyst operative in the present invention comprises iron-containing spinel phase (before activation). In its most general form, spinel phase indicates a mixed oxide having the formula $A^{2+}B^{3+}O_4$. According to the present invention, the divalent ion $A^{2+}$ is $Fe^{2+}$ and is essentially free of $Cu^{2+}$, whereas the trivalent ion $B^{3+}$ is $Fe^{3+}$ in combination with $Al^{3+}$. Thus, the spinel component of the catalyst may be represented by either one of the two formulas:

  (spinel of Formula 1)

wherein y is in the range from 0.05 to 0.95; or

  (spinel of Formula 2)

wherein x is in the range from 0.0 to 0.05, i.e., 0.0<x≤0.05 and y is in the range from 0.05 to 0.95.

According to the notation used herein, a catalyst which consists of hematite and spinel phases together is represented by the formulas:

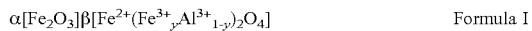  Formula I

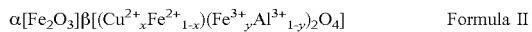  Formula II wherein α is <5 wt % and β>95 wt %, correspondingly, and x and y are as previously defined.

More preferably, however, the catalyst according to the invention does not contain hematite phase and is copper-free. Thus, the preferred catalyst consists of a spinel of Formula 1:

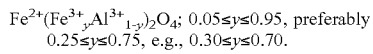

In its most preferred form, the catalyst consists of potassium promoted spinel of Formula 1: $K/Fe^{2+}(Fe^{3+}_y Al^{3+}_{1-y})_2O_4$, wherein y is in the range from 0.05 to 0.95, more preferably from 0.25 to 0.75, even more preferably from 0.3 to 0.7, and specifically from 0.4 to 0.6, with the weight ratio Fe:Al:K preferably varying from 100:20:3 to 100:30:10. The formula $K/Fe^{2+}(Fe^{3+}_y Al^{3+}_{1-y})_2O_4$ indicates that the potassium is applied onto the surface of the spinel of Formula 1.

The catalyst of the invention is prepared by a process comprising dissolving in an aqueous solution at least one ferric compound and at least one aluminum compound, and optionally cupric compound, adjusting, preferably gradually, the pH of the metal-containing solution, e.g., to about 6.0-8.5, by means of an addition of an alkaline agent, whereby co-precipitation of the metals in the form of their hydroxides occurs, separating the solid formed from the liquid phase, and subjecting same to drying and calcination (for dehydration and formation of the spinel phase and optionally hematite phase).

Suitable starting materials for use in the preparation of the catalyst are water-soluble ferric and aluminum salts, such as the nitrate salts. The metal nitrates exist in hydrated forms: $Fe(NO_3)_3 \cdot 9H_2O$ and $Al(NO_3)_3 \cdot 9H_2O$, which are especially preferred. The preferred concentrations of the ferric and aluminum salts in the aqueous solution are from 1900 to 2100 and 900 to 1100 gram/L, respectively, with the relative amounts of the salts being adjusted to form the desired composition of the catalyst. The water-soluble metal salts, e.g., the nitrates, can be added to the aqueous solution in a solid form in any desired order, or can be pre-dissolved in separate solutions, which are subsequently combined together. Preferably, the weight ratio Al:Fe in the solution is not less than 20:100, e.g., from 20:100 to 30:100.

The experimental results reported below indicate that the best catalysts of the invention are the copper-free pure spinel of Formula 1. However, the presence of small amounts of copper, i.e., the catalysts $(Cu^{2+}_x Fe^{2+}_{1-x})(Fe^{3+}_y Al^{3+}_{1-y})_2O_4$ (spinel of Formula 2) can still be used, provided that x is less than 0.05. In the event that the catalysts of Formula 2 are contemplated, cupric salt, e.g., $Cu(NO_3)_2 \cdot 3H_2O$ is added to the solution described above.

The adjustment of the pH of the aqueous solution to the range from 6.0-8.5, e.g., 7.0-8.5, especially from 7.5 to 8.0, in order to affect the co-precipitation of the metal hydroxides, is preferably accomplished by means of gradual addition of an aqueous solution of a base, such as ammonium hydroxide, which solution is preferably applied in a dilute form, with concentration of not more than 5% by weight. The gradual addition preferably lasts not less 10 minutes, e.g., not less than 20, 30 or 60 minutes, and may be accomplished by portionwise addition or feeding a stream of ammonium hydroxide solution at a suitably slow flow rate. During pH adjustment, the solution of the metals and the slowly added $NH_4OH$ solution are preferably held at a temperature below 30° C., e.g., at room temperature. The experimental results reported below indicate that a sharp increase of the pH of the aqueous metal solution (e.g., due to a rapid addition of a concentrated alkaline solution) may unfavorably alter the composition of the catalyst, ultimately causing the formation of the hematite phase following the calcination stage. Working with Al:Fe weight ratio as set out above and carefully basifying the solution afford, following the calcination, the hematite-free spinel of Formula 1.

The precipitate formed is separated from the mother liquor, e.g., by filtration or any other solid/liquid separation technique, and is preferably washed with water and dried at temperature in the range of 100-140° C. for period of at least h. Before the calcination step, the dried material is preferably treated with an aqueous solution of a potassium salt, e.g., the solid is impregnated with a solution of potassium carbonate, nitrate or acetate until incipient wetness is observed, followed by drying. The impregnation-drying cycle may be repeated several times, in order to load the potassium solution onto the surface of the solid. The presence of potassium renders the surface of the catalyst slightly alkaline, and hence increases the affinity of the catalyst towards carbon dioxide, which is an acidic gas. In general, the weight ratio Fe:K is in the range from 100:3 to 100:10.

The solid is then subjected to drying in air at a temperature in the range of 100-140° C. for period of at least 24 hours followed by calcination in air at a temperature in the range from 400 to 500° C. for period of at least 6 h.

The catalyst obtained exhibits surface area of not less than 80 m²/gram, e.g., between 80 and 180 m²/gram; pore volume of not less than 0.1 cm³/gram, e.g. between 0.1 and 0.5 cm³/gram, and average pore diameter between 3.0 and 7.0 nm. Elemental analysis by means of energy dispersive X-ray spectroscopy of the preferred catalyst of Formula 1 indicates that the weight ratio Fe:Al is in the range from 100:20 to 100:30. X-Ray Diffraction (XRD) indicates that the preferred catalyst of Formula 1 has average crystal size of 1.5 to 3 nm.

The experimental results reported below indicate that the use of a pure copper-free Al-substituted spinel phase, i.e., the compound of Formula 1, in a nano-sized form, results in an increase in the $CO_2$ conversion and also in a better reaction selectivity towards the heavier, liquid hydrocarbons (designated $C_{6+}$). The spinel component, after activation and self-organization at $CO_2$ hydrogenation conditions, is highly active and capable of supporting the conversion of carbon dioxide at an appreciable extent to higher hydrocarbons $C_{5+}$. When the hydrogenation of $CO_2$ is carried out in the presence of a spinel catalyst containing a hematite component, its activity is lower due to the formation of a large amount of carbon deposits blocking the active phases. This is a result of oxidation of Fe-carbide phases formed during hematite carburization at the activation step by reactions with $CO_2$ and water formed in the process:

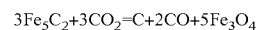

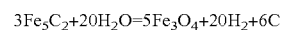

Conversely, the hematite phase alone, which transforms at the activation step to carbides $Fe_5C_2$ and $Fe_7C_3$, is capable of producing the desired high olefins/paraffins, but is not sufficiently active to permit acceptable $CO_2$ conversion. However, a catalyst which consists of pure K-promoted spinel phase, i.e., the catalyst of Formula 1, particularly when subjected to specific activation conditions and employed in a continuous process running through a set of successively arranged reactors, namely, a cascade of reactors, demonstrates an excellent activity. The high activity is amounting to depressing of the formation of carbon deposits and stabilization of active carbide phases in a modified spinel matrix. This modified spinel matrix has less Fe content reduced at activation and in situ self-organization of the parent spinel phase due to partial removal of Fe-ions forming carbide phases $Fe_5C_2$ and $Fe_7C_3$. It appears that the presence of copper [i.e., in the spinel of Formula 2: $(Cu^{2+}_x Fe^{2+}_{1-x})(Fe^{3+}_y Al^{3+}_{1-y})_2 O_4$] facilitates reduction of iron ions during activation and at $CO_2$ hydrogenation conditions. We have found that copper is redundant when the activation is accomplished by means of carburization.

It should be noted that the catalyst of the invention can be processed to form pellets. To this end, the powdery material collected following the precipitation and separation of the spinel of Formula 1 $Fe^{2+}(Fe^{3+}_y Al^{3+}_{1-y})_2 O_4$ from its mother liquor is combined with a binder such as aluminum hydroxide (bohemite) powder and water to form a workable slurry. For example, the weight ratio $Fe^{2+}(Fe^{3+}_y Al^{3+}_{1-y})_2 O_4$:alumina:water is from 1:0.14-0.71:0.43-0.86. The mixture is extruded and the so-formed extrudates are loaded with potassium, e.g., by means of the aforementioned impregnation with potassium carbonate solution, followed by drying and calcination. Another way to form pellets from the spinel of Formula 1 $Fe^{2+}(Fe^{3+}_y Al^{3+}_{1-y})_2 O_4$ is by means of pressurizing the calcined powder after insertion of potassium using special form that yield cylindrical or empty cylindrical pellets.

In use, the catalyst of the invention is loaded into a suitable reactor, e.g., a continuous fixed bed reactor, or into a plurality of consecutively arranged reactors, as described in more detail below. The catalyst may be applied either in a powder or granular form. For example, the particle size of the catalyst used may be in the range from 100 μm to 3 mm. Thus, the powdery catalyst collected following the calcination step may be granulated, milled and then passed through a suitable sieve in order to collect the desired population of particles. The catalyst may also be applied in the form of pellets. The thickness of the catalyst layer packed in the reactor may vary within the range of 7 mm to 3 m provided the particle size is selected so as to avoid excessive pressure drop.

In order to be operative in the carbon dioxide hydrogenation process, the catalyst needs first to undergo activation. The activation of the catalyst is carried out in-situ, by either reduction (hydrogenation) or carburization.

Reduction involves the flow of hydrogen stream through the reactor in which the catalyst is placed at a temperature of not less than 400° C. The flow rate of the hydrogen stream is not less than 100 cm³/min per gram of catalyst. The reduction is continued at atmospheric pressure for not less than 3 hours. After that the temperature is adjusted in hydrogen flow according to the process conditions and a $CO_2/H_2$ mixture is fed to the reactor.

Carburization involves the exposure of the catalyst to a carbon-containing atmosphere. To this end, streams of carbon monoxide, hydrogen and an inert gas carrier are caused to flow through the reactor in which the catalyst is placed at a temperature of not less than 300° C. The flow rates of the three gaseous components (CO, $H_2$ and inert gas ($N_2$, He, Ar)) are at least 30:30:150 cm³/min per one gram of the catalyst, respectively. The carburization is continued at atmospheric pressure for not less than 3 hours.

The experimental results reported below indicate that the mode of catalyst activation is of significance. The reduction leads to the transformation of the iron ions in spinel phase into the metallic iron that is subsequently converted to a mixture of $Fe_3O_4$ inactive in Fischer-Tropsh reaction and catalytically active $FeC_x$ carbide phases. Activation by means of carburization is preferred since it converts iron ions existing in the spinel phase in the starting catalyst directly to iron carbide phases of higher dispersion (particles of 20-35 nm) leaving the Fe-impoverished spinel phase as aggregates of nanoparticles of higher dispersion (8-10 nm) randomly mixed with iron carbide nanoparticles (FIG. 1b). After hydrogen reduction and stabilization at reaction conditions the nanoparticles of carbide and spinel phases are larger (50-100 nm) and separated from each other by carbon that decreased the contact interface between carbide and spinel phases (FIG. 1a).

Typical X-ray diffraction patterns of the fresh, activated (carburization) and stabilized at $CO_2/H_2$ hydrogenation conditions catalyst of the present invention are presented in FIG. 2. The fresh catalyst consists of spinel phase of Formula 1 of high dispersion with crystal size of 1.5 to 3 nm, e.g., around 2 nm. After activation by carburization and stabilization in $CO_2/H_2$ hydrogenation at 300° C. for 100-150 h, e.g., 120 h, the spinel phase is converted to Fe-carbide phases with crystal size of 25 and 45 nm while the crystal size of the spinel phase increases to 8.5 nm with decreasing the y value in its formula $Fe(Fe_y Al_{1-y})_2 O_4$ from 0.47 to 0.25. It means that part of the iron in the spinel phase during activation-stabilization is converted to carbides. It is believed that the activity of the catalysts of the invention resides in the combination of the catalytic action of two phases—spinel catalyzing presumably the reverse water gas shift reaction producing CO, and iron carbides catalyzing both reverse water gas shift and Fischer-Tropsch reaction that converts $CO/H_2$ to hydrocarbons.

The effect of hematite phase content that may exist in the catalyst together with the substituted spinel phase at different amounts depending on the synthesis conditions is clearly illustrated in FIG. 3, which compares the $CO_2$ conversions and liquid hydrocarbon oil productivities measured in testing examples of the present invention and comparative examples at standard conditions. As shown in FIG. 3, the content of hematite phase in copper-free catalysts was in the range from 0 (pure spinel) to 100% (pure Fe-oxides). The catalyst containing pure spinel without Fe-oxide phase demonstrated the most efficient combination of catalytic activity and selectivity to $C_{6+}$ hydrocarbons reflected by highest productivity of $C_{6+}$ hydrocarbons. The pure Fe-oxide phase without Al—, mixed Fe—Al—O-spinel—$Fe_2O_3$ materials or Cu—Al containing spinel promoted with potassium after activation display much lower activity in $CO_2$ hydrogenation to hydrocarbons than the catalyst consisting of pure Fe—Al—O spinel phase.

Accordingly, another aspect of the invention is a process for the preparation of hydrocarbons comprising the hydrogenation of carbon dioxide-containing gas in the presence of iron-containing catalyst devoid of hematite phase, said catalyst being copper-free, wherein the catalyst is activated in-situ by means of carburization, said carburization comprises treating said catalyst with a mixture of $H_2$ and CO at elevated temperature. Following carburization, the content of the carbide phases in the catalyst is less than 15 wt %, preferably from 5 to 10 wt %, relative to the total weight of the catalyst.

Following the in-situ activation of the catalyst, the carbon dioxide hydrogenation reaction is allowed to start. Carbon dioxide-containing gaseous stream and hydrogen stream are continuously fed to the reactor at $H_2/CO_2$ of not less than 2 and weight hourly space velocity (WHSV) not less than 0.1 $h^{-1}$, preferably not less than 0.5 and more preferably not less than 1. The reaction is carried out at a temperature in the range from 250 to 360° C. (for example, in the range from 320 to 360° C., especially 325° C. to 350° C.) at pressure of not less than 5 atmospheres, e.g., from 10 to 30 or at a pressure higher than 20 atmospheres, e.g., in the range from 20 to 50, especially 20-40.

It should be noted that the carbon dioxide-containing gas stream used in the present invention may be neat carbon dioxide and also any gas mixture which contains carbon dioxide, for example, a mixture of carbon dioxide and carbon monoxide, with the molar fraction of carbon dioxide being not less than 0.25, more specifically not less than 0.5.

The reactants are preferably employed in the following molar ratios:

For a feed consisting of hydrogen and carbon dioxide, the hydrogen to $CO_2$ molar ratio is less than 4:1 (e.g., not more than 3:1, for example, from 3:1 to 2:1); for a feed consisting of hydrogen, carbon dioxide and carbon monoxide, the hydrogen to $(3CO_2+2CO)$ molar ratio is ≤1, e.g., <1, for example, from 0.6 to 1, e.g., from 0.6 to 0.97.

The present invention therefore provides a process for the preparation of hydrocarbons, comprising the hydrogenation of carbon dioxide-containing gas in the presence of the catalyst of Formula 1, wherein the catalyst is activated in-situ by means of carburization, said carburization comprises treating said catalyst with a mixture of $H_2$ and CO at elevated temperatures, wherein following said carburization, the hydrogenation reaction takes place at a total pressure of not less than 20 bar at a temperature higher than 320° C., wherein hydrogen and carbon dioxide are fed at a molar ratio of not more than 3 or, hydrogen, $3CO_2$ and $2CO$ are fed at a molar ratio of not more than unity.

As already noted above, it has been found that it is advantageous to conduct the catalytic hydrogenation of carbon dioxide-containing gaseous stream via a cascade process, namely, by using a plurality of fixed bed reactors arranged is series. The chief advantage offered by the cascade process of the invention resides in that it allows the introduction of intermediary step of water removal between each pair of serially-connected reactors. It has been found that water, which is a co-product of the reaction, has a double negative effect on the catalysts performance. First, the partial pressure of the water, which increases along the catalyst bed from inlet to outlet, inhibits the reverse water-gas shift reaction: $CO_2+H_2 \rightarrow CO+H_2O$, thus it limits the $CO_2$ conversion. Second, at high partial pressure of water the active carbide $Fe_5C_2$ phase is oxidized to iron oxide that deactivates the catalyst. As a result, $CO_2$ conversion in one reactor reaches a limited value, well below 100%. (the experimental results reported below indicate that conversion measured at 300° C., WHSV<1 $h^{-1}$ and total pressure of 10 atm asymptotically approaches ~60%).

Accordingly, one aspect of the invention relates to a cascade process for hydrogenation of carbon dioxide-containing gaseous stream employing a plurality of serially arranged reactors, comprising:
(i) feeding carbon dioxide-containing gas stream and hydrogen stream into at least the first of said serially arranged reactors which are loaded with iron-containing catalyst, said catalyst being copper-free, wherein said catalyst was brought to an active form by means of carburization;
(ii) discharging a gaseous reaction stream from at least one of said serially arranged reactors and cooling same, to form a liquid-gas mixture, wherein the liquid component of said mixture comprises condensable reaction products consisting of water and organic liquids, and the gas component of said mixture comprises reactants and non-condensable reaction products;
(iii) removing said gaseous component from said liquid component;
(iv) separating said liquid component into an organic and aqueous phases, and collecting at least said organic phase;
(iv) directing the removed gaseous component into the successive reactor in said serially arranged reactors.

A suitable apparatus for carrying out the process of the invention is schematically illustrated in FIG. 4, in which the cascade configuration consists of three serially arranged reactors.

The serially-positioned reactors are designated by numerals (1), (2) and (3). Each reactor is provided with a suitable amount of a catalyst loaded therein. The amount of catalyst in each reactor is adjusted to improve conversion and productivity. Alternatively, the total amount of the catalyst used in the process may be equally divided between the set of reactors.

Each reactor is provided with a discharge line (4), with a cooler (5), a gas-liquid separator (6) and a liquid-liquid separator (7) positioned successively along said discharge line. Each liquid-liquid separator (7) is connected to two tanks, (8) and (9), for collecting organic and aqueous phases, respectively. The gas-liquid separator is connected by means of a feed line (10) into the consecutive reactor.

Carbon dioxide, hydrogen and optionally carbon monoxide required for the process are supplied through feed lines (11), (12) and (13), respectively. Hydrogen may be produced by the electrolysis of water in an electrolysis unit (not shown) and carbon dioxide may be recovered from industrial processes such as the combustion of fossil fuels in power generating plants, cement or steel plants. Another useful source of the reactans required for the process is carbon dioxide-rich syngas, i.e., a gas mixture comprising $CO_2$, $H_2$ and CO where the concentration of $CO_2$ is greater than the normal concentration in conventional syngas, i.e., the molar fraction of carbon dioxide in the syngas is not less than 0.25 and preferably not less than 0.5.

In the specific embodiments shown in FIG. 4, separate $CO_2$, $H_2$ and CO feeds are shown, equipped with flow controllers (14), and the gases are combined in a feed line (15) and introduced into the first reactor. While the description that follows relates to the embodiment illustrated in FIG. 4, it should be noted that a combined gaseous stream, e.g., carbon dioxide-rich syngas, may be utilized.

In operation, carbon dioxide (11) and hydrogen (12), and optionally carbon monoxide (13) streams are fed to the first of said serially arranged reactors, with their relative amounts being adjusted by means of flow controllers (14). As shown in FIG. 4, hydrogen may be directly fed also to each of the successive reactors by means of feed lines (15, 16) equipped with flow controllers (14), so as to maintain an optimal ratio between the gaseous reactants. For example, $CO_2$, $H_2$ and CO may be fed at molar ratios 1:5:1.

The temperature and pressure maintained within each of the serially-placed reactors are as set forth above, and the preferred WHSV, when using the copper-free catalyst of the invention, i.e., of Formula 1, is not less than 0.5.

The gaseous mixture produced at each reactor is discharged (4), and subjected to cooling and condensation (5) whereby a liquid-gas mixture is obtained. This mixture is separated into its liquid and gaseous components in a gas-liquid separator (6).

The gaseous, non-condensable component, which consists of non-reacted $CO_2$, $H_2$ and CO with light organic compounds is removed from the liquid component and fed directly to the next reactor via line (10). The liquid component is fed to a liquid-liquid separator (7), where it is separated into organic and aqueous phases, which are collected in two distinct tanks. The organic product (8) (containing mainly alkanes and alkenes with 6-20 carbon atoms in their molecules) is further processed to produce high-quality liquid fuels by methods known in the art. As shown in FIG. 4, a further separation may be conducted after the third stage, to separate liquids from non-condensable products.

Notably, the cascade configuration illustrated in FIG. 4 removes the limitations on $CO_2$ conversion rendered by high water partial pressure in the downstream parts of the catalysts layer in one fixed-bed reactor and allows reaching $CO_2$ conversions of >75% and up to >90%.

Implementation of the reactors cascade arrangement according to the present invention, with water removal between each pair of successive reactors, allows to get higher $CO_2$ conversions and oil productivities in comparison to operating with the same catalyst but in a single reactor. This improvement is obtained irrespective of the type of catalyst used (either pure Fe-oxide or spinel or mixed catalysts) and composition. Implementation of cascade reactors configuration according to the present invention removes the limitation of ~60% $CO_2$ conversion that appears to be the upper limit when using Fe-based catalysts in a single reactor. This allows reaching >90% $CO_2$ conversion at $WHSV>1\ h^{-1}$.

The present invention permits obtaining the liquid hydrocarbon oil as an excellent feedstock for production of transportation fuels: gasoline, jet fuel and diesel fuel according to well established technologies [A. de Klerk, Energy Environ. Sci., 2011, 4, 1177]. The oil productivity at similar total WHSV obtained in three reactors in series increases by about factor of 3 and reaches 170-520 gram of oil per kilogram of catalyst per hour. This corresponds to the productivity of about 0.5 million ton oil/year of the unit with 100 ton catalysts loading. The catalysts according to the present invention tested in a cascade reactors arrangement demonstrated excellent stability in 500 hour on stream runs.

A typical chromatogram of the liquid oil produced by the hydrogenation process of the invention indicates that the oil consists of hydrocarbons with 6 to 27 carbon atoms where distribution maximum is centered at 10-12 carbon atoms. As shown in the bar diagram of FIG. 5, the hydrocarbon compositions of the liquid products formed in each of the three consecutive reactors are comparable (in each set of adjacent bars, the left, middle and right bars correspond to the first, second and third reactors placed in series) The oil contains about 60 wt % of n-olefins and n-paraffins at weight ratio of 5:1, about 1 wt % aromatics, 0.1-0.2 wt % oxygenates and the rest—iso-olefins and iso-paraffins at weight ratio of 4:1. The water fraction separated from oil contains 2-5 wt % of total organic carbon in form of light oxygenates.

Distillation patterns demonstrate that the organic liquid obtained in $CO_2$ hydrogenation according to the present invention can be separated by distillation to gasoline, jet and/or diesel fuels fractions according to technical needs. These fractions may be further upgraded to fit the fuels specification requirements by means of methods known in the art, e.g., as it is done for hydrocarbon products obtained in a regular $CO/H_2$ Fischer-Tropsch process [A. de Klerk, supra].

IN THE DRAWINGS

The patent or application file contains at least one drawing/photograph executed in color. Copies of this patent with color drawing(s) will be provided by the Office upon request and payment of the necessary fee.

Figure 1:
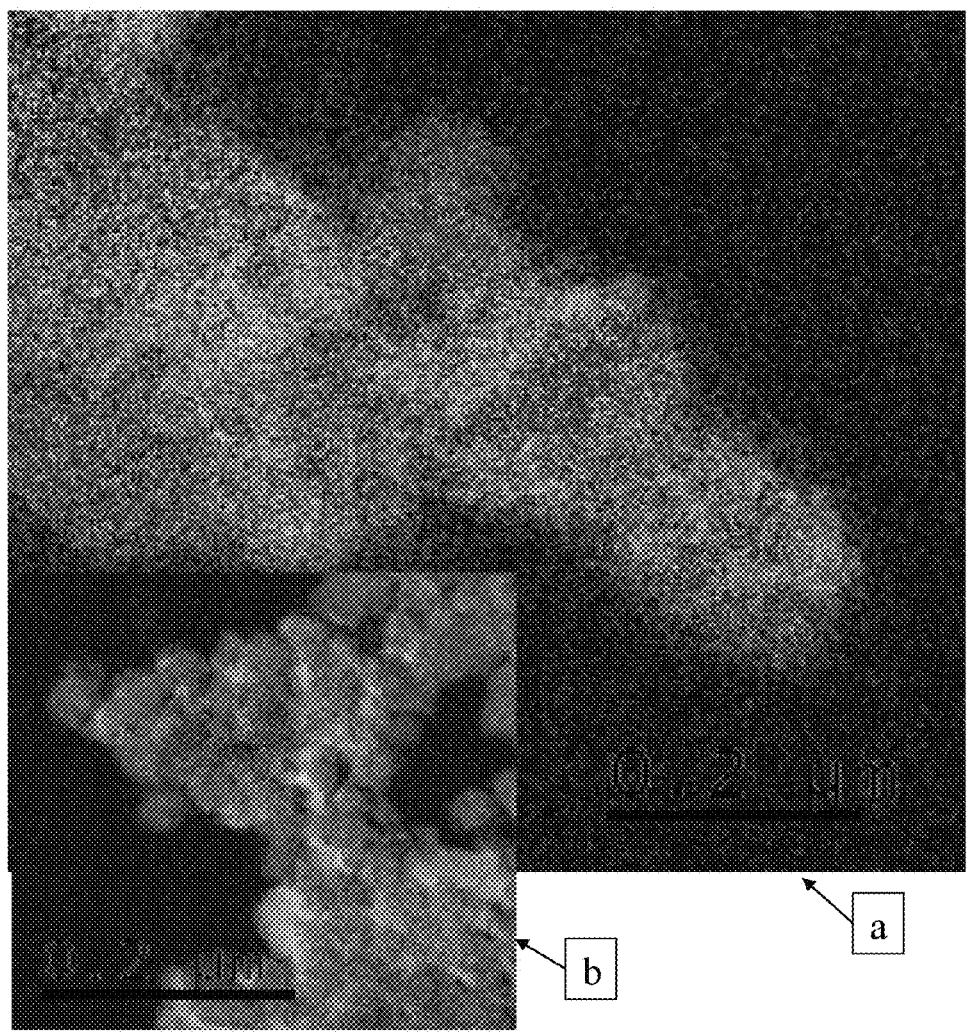
FIG. 1 shows the multicomponent elements distribution maps of K/Fe—Al—O-spinel catalyst obtained by HRTEM/EELS: (1)—after hydrogen reduction and stabilization in $CO_2$ hydrogenation at 300° C. for 120 h; (2)—after carburization and stabilization in $CO_2$ hydrogenation at 300° C. for 120 h.
Figure 2:
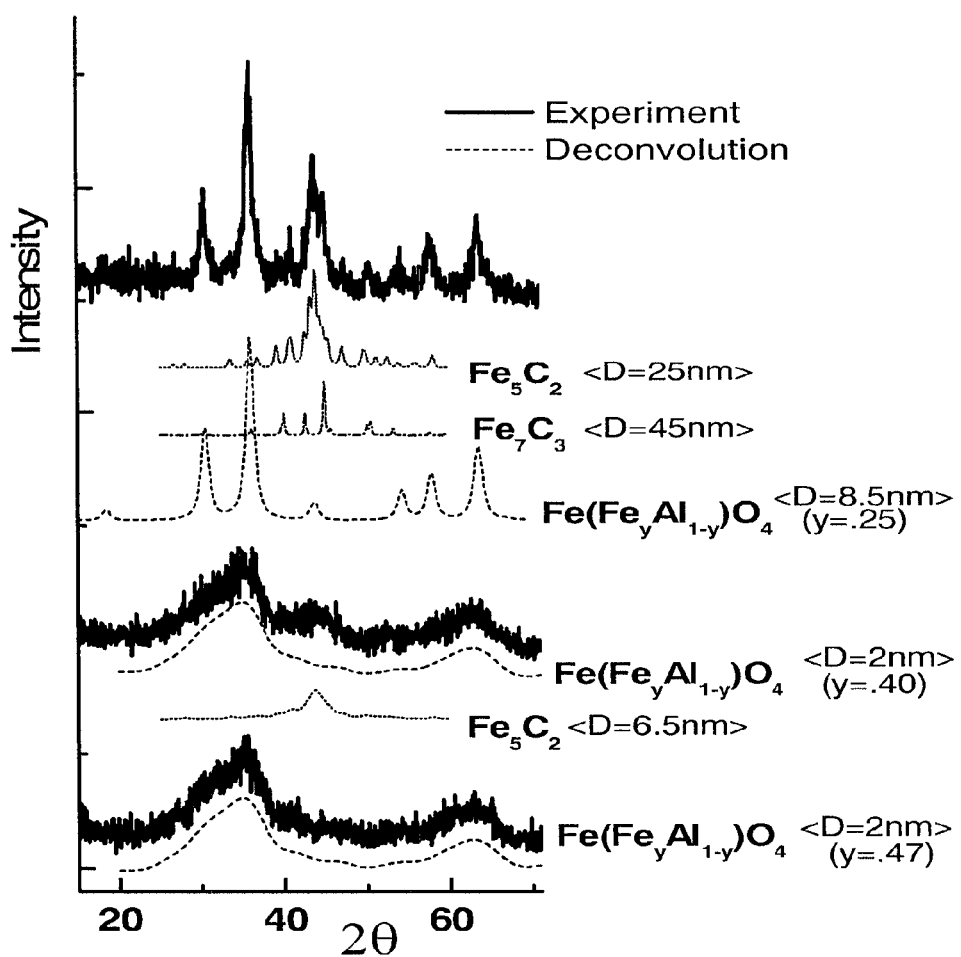
FIG. 2 shows XRD patterns of K/Fe—Al—O-spinel catalyst: (1)—fresh; (2)—after activation by carburization; (3) after stabilization in $CO_2$ hydrogenation at 300° C. for 120 h.
Figure 3:
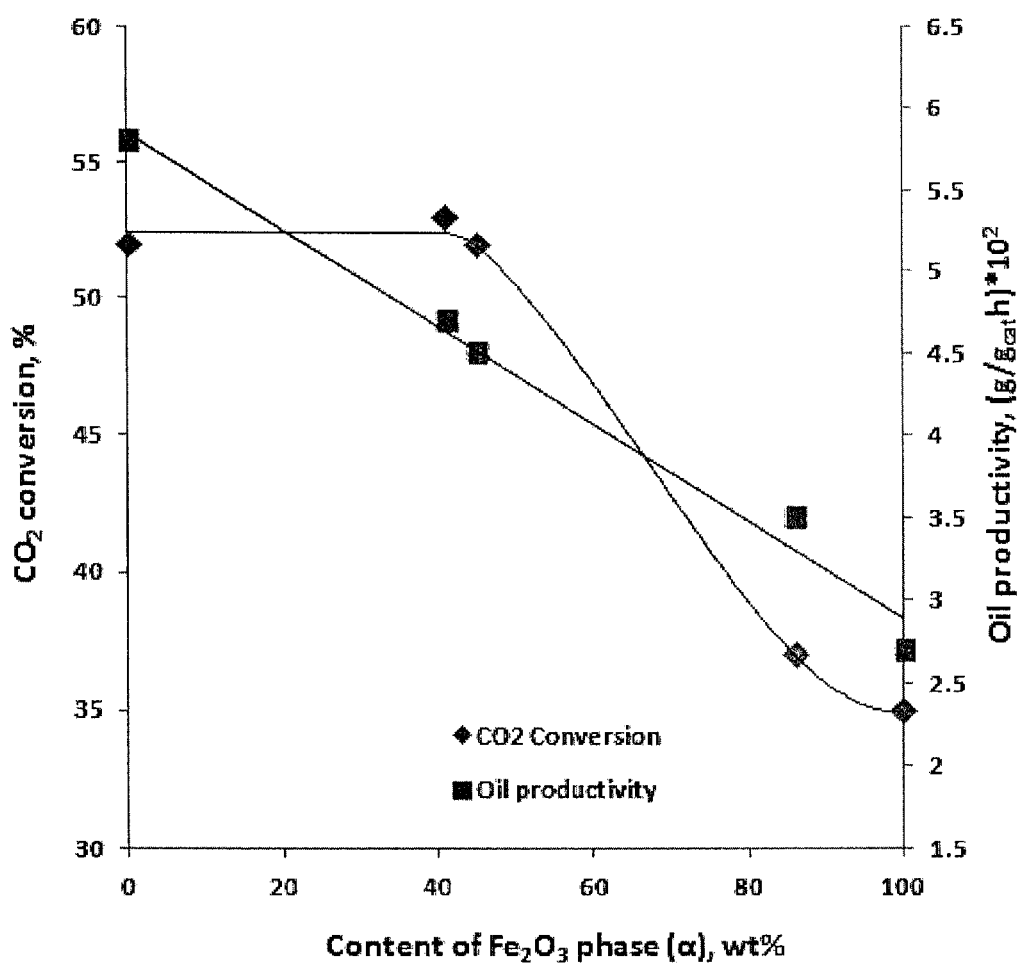

FIG. 3 demonstrates the effect of the content of $Fe_2O_3$ (Hematite) phase in the mixed $Fe_2O_3$—Fe—Al—O-spinel catalyst on the catalysts performance in $CO_2$ hydrogenation. Testing conditions: T=300° C., $P_{total}$=10 atm, $H_2/CO_2$=4.

Figure 4:
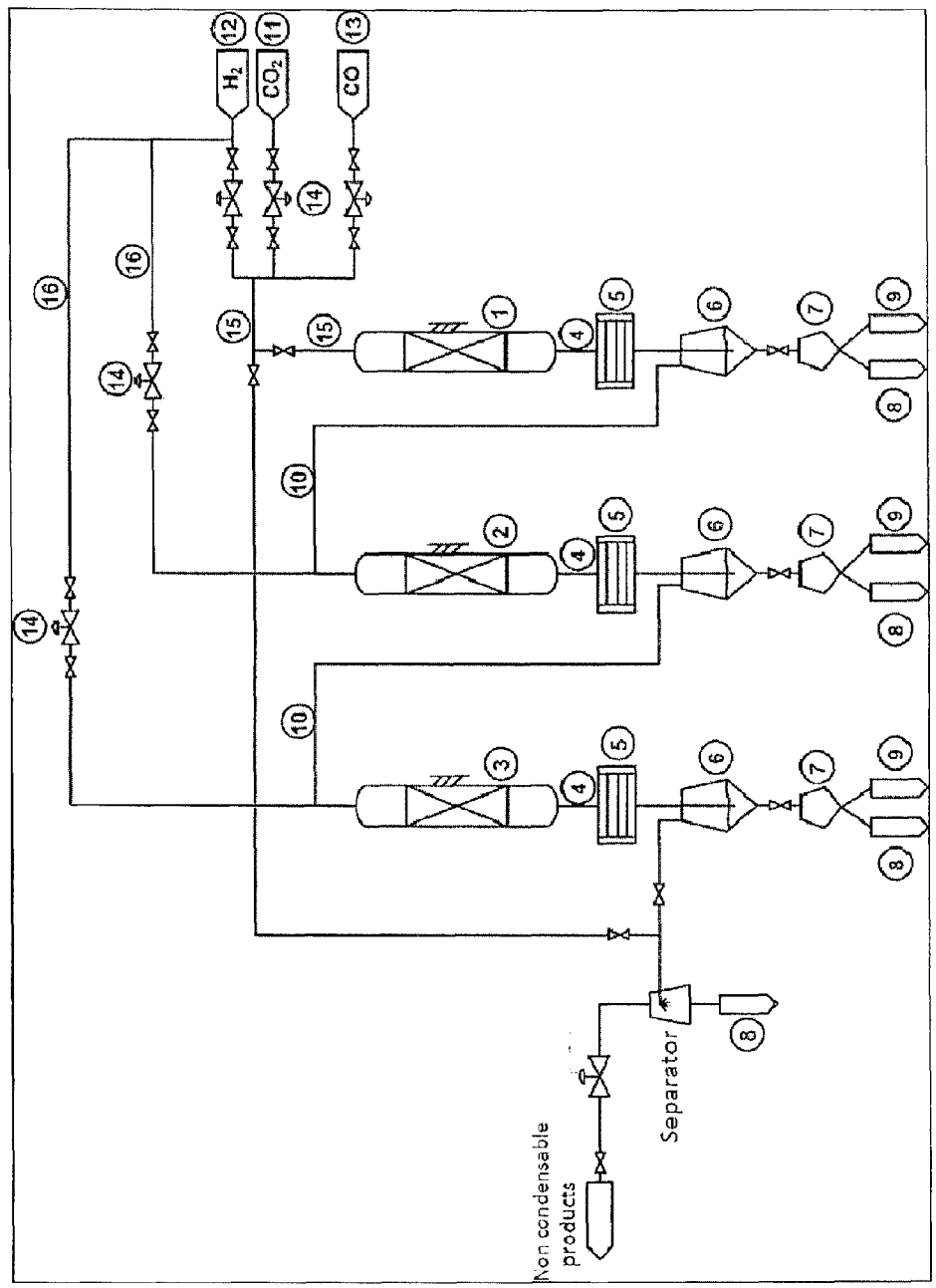

FIG. 4 illustrates a scheme of an apparatus based on a cascade reactors system useful for $CO_2$ hydrogenation. (1), (2) and (3) serially-positioned reactors; (4) discharge line; (5) cooler; (6) gas-liquid separator; (7) liquid-liquid separator; (8) organic collector; (9) aqueous phases collector; (10) feed line into the consecutive reactor; (11), (12) and (13) carbon dioxide, hydrogen and carbon monoxide feed lines, respectively; (14) flow controllers; (15), (16) gas feed lines.

Figure 5:
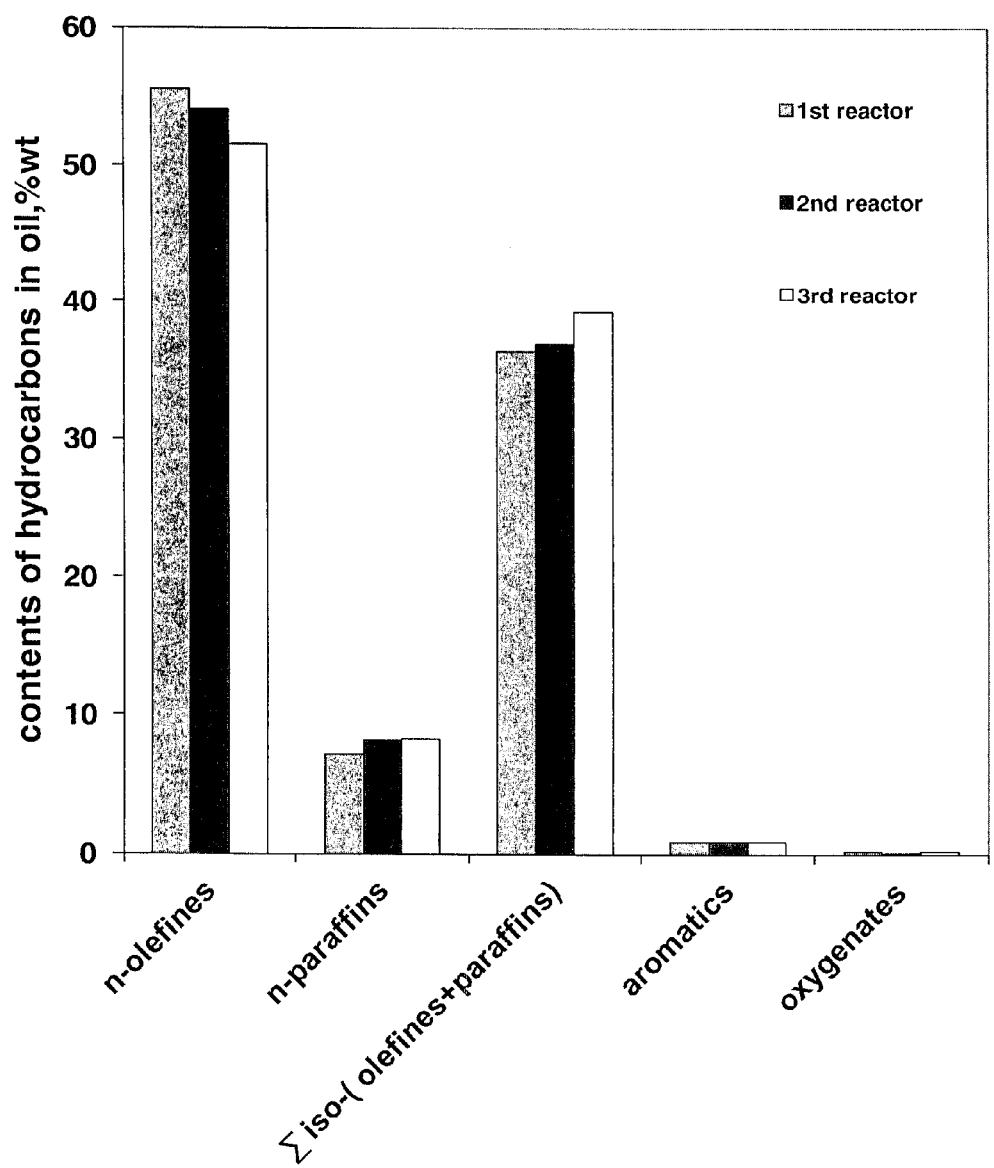

FIG. 5 is a bar diagram illustrating the contents of paraffins, olefins, aromatics and oxygenates in the hydrocarbon oil obtained after one, two and three reactors in series.

EXAMPLES

Methods
X-Ray Diffraction (XRD)

The X-ray diffraction (XRD) patterns were obtained with a Phillips 1050/70 powder diffractometer fitted with a graphite monochromator, at 40 kV and 28 mA. Software developed by Crystal Logic was used. The data were collected in a range of 2θ values between 5° and 80° with a step size of 0.05°. Phase identification was performed by using BEDE ZDS computer search/match program coupled with the ICDD (International Center for Diffraction Data) Powder Diffraction File database (2006). The average crystal size of $Fe_3O_4$, $Fe^{2+}(Fe^{3+}_y Al^{3+}_{1-y})_2O_4$ spinel, $Fe_2O_3$, $Fe_5C_2$ and $Fe_7C_3$ phases was determined from the Scherrer equation $h=K\lambda/[(B^2-\beta^2)^{0.5} \cos(2\theta/2)]$, where K=1.000 is the shape factor, λ=0.154 nm, β is the instrumental broadening correction, and B is the reflection broadening at corresponding 2θ. The average crystal size was obtained by averaging of the data calculated for reflections (110), (200); (220), (311); (220), (311), (440); (020), (112); (102), (211) and (110), (200) of the XRD patterns corresponding to the Hematite $Fe_2O_3$ phase (ICDD Card 86-550), Magnetite $Fe_3O_4$ (ICDD Card 19-629), Cu—Al—Fe—O spinels (ICDD Cards 34-192, 77-10), Hägg carbide $Fe_5C_2$ (ICDD Card 36-1248), carbide $Fe_7C_3$ (ICDD Card 17-333) and metallic α-Fe (ICDD Card 6-696) phases, respectively. The relative content of Fe-oxides, carbide phases and amorphous carbon phase represented in X-ray diffractograms by a wide reflection centered at 2θ=22° was obtained by Rietveld refinement of the XRD profile by using the DBWS-9807 program.

The composition of spinel phases nanoparticles in prepared catalytic materials was derived from XRD data—by fitting the measured parameters of the unit cell of cubic $Fe_3O_4$-phase to the contents of $Cu^{2+}$ and $Al^{3+}$ ions at tetrahedral and octahedral positions, respectively, in the cubic framework of spinel phase with space group Fd3m. The parameters of unit cells of spinel phases were calculated based on the positions of reflections detected in X-ray diffractograms around $2\theta=30°$ (220), $35.5°$ (311) and $63°$ (440).

Surface Area and Pore Volume Measurements

Surface area and pore volume were derived from $N_2$ adsorption-desorption isotherms using conventional BET and BJH methods (Barrett-Joyner-Halenda method, Journal of American Chemical Society, 73, 373, 1951). The samples were degassed under vacuum at 250-70° C., depending on their thermal stability. Isotherms were measured at liquid nitrogen temperature with a NOVA-2000 Quantachrome, Version 7.02 instrument.

Energy Dispersive X-Ray Spectroscopy (EDAX)

The total elemental composition of catalysts was measured by EDAX method using Quanta-200, SEM-EDAX, FEI Co. instrument. The contents of $Cu^{2+}$ and $Al^{3+}$ ions in spinel nanoparticles were confirmed by the data of local EDAX method recorded with the electronic spot diameter of 5 nm with the field emission analytical transmission electron microscope (JEOL JEM-2100F) operated at accelerating voltage of 200 kV. The nanoparticles of spinel phases were identified by recording the multicomponent distribution maps for nanoparticles observed at HRTEM images.

High Resolution TEM/Electron Energy Loss Spectroscopy (HRTEM/EELS)

The transmission electron microscope (JEOL JEM-2100F) used for materials analysis was equipped with a Gatan imaging filter (GIF Quantum)/EELS system. Regular and energy-filtered images were taken from the same samples point for Fe, O and C elements at L-edge 708 eV; K-edge 532 eV and K-edge 284 eV, respectively. The obtained elemental distributions maps were further combined in one RGB image marking Fe by red, C by green and O by blue colors. This yielded multicomponent elements distribution maps for nanoparticles observed in regular HRTEM images. Gatan Digital Micrograph software was used for EFTEM imaging, recording and processing of EELS data. The samples for HRTEM were prepared by depositing a drop of ethanol suspension of the solid catalyst on a silica-coated copper grid that formed a contrast oxide background for carbon-rich particles.

Example 1 (Comparative)

Preparation of a Catalyst Consisting of Hematite Phase [$Fe_2O_3$] and Spinel Phase of the Formula [$(Cu^{2+}_xFe^{2+}_{1-x})(Fe^{3+}_yAl^{3+}_{1-y})_2O_4$; (x=0.54, y=0.65)]

The catalyst was prepared by co-precipitation from the aqueous solution of Fe, Cu and Al nitrates by addition of aqueous ammonium hydroxide solution. 21.0 gram of $Al(NO_3)_3.9H_2O$, 72.3 gram of $Fe(NO_3)_3.9H_2O$ and 6.8 gram of $Cu(NO_3)_2.3H_2O$ salts were dissolved in 20, 20 and 4 cm$^3$ of distilled water, respectively. All three solutions were then mixed together, and 500 cm$^3$ of 3% $NH_4OH$ solution were gradually added to this mixed salts solution at room temperature under stirring during a period of 10 min. The pH of solution after the addition of $NH_4OH$ was 6.8. A solid precipitated from the solution. The solid was separated by filtration and washed on the filter with 500 cm$^3$ of distilled water. Then the solid was dried in air at 110° C. for period of h. The obtained material was impregnated by incipient wetness with aqueous solution containing 1.04 gram $K_2CO_3$. The impregnated material was dried in air at 110° C. for period of 48 h and calcined in air at 450° C. for period of 6 h (temperature increasing rate 5° C./min). The material has the following weight ratio of metal components (EDAX): Fe:Al:K:Cu=100:15:6:5, surface area 100 m$^2$/g, pore volume 0.17 cm$^3$/g and average pore diameter 4.3 nm. The material contained two phases (XRD): 30 wt % of hematite $Fe_2O_3$ and 70 wt % of phase with spinel structure which composition reflects partial isomorphous substitution of $Fe^{2+}$ ions with $Cu^{2+}$, and $Fe^{3+}$ ions with $Al^{3+}$ ions, such that the spinel phase of the catalyst has the formula:

$[(Cu^{2+}_xFe^{2+}_{1-x})(Fe^{3+}_yAl^{3+}_{1-y})_2O_4]$ where x=0.54 and y=0.65.

Example 2 (Comparative)

Preparation of a Catalyst Consisting of Spinel Phase Only [$(Cu^{2+}_xFe^{2+}_{1-x})(Fe^{3+}_yAl^{3+}_{1-y})_2O_4$; (x=0.72, y=0.71)]

The catalyst was prepared according to procedure described in Example 1. However, in the present example the adjustment of pH value to 6.8 was achieved by adding 200 cm$^3$ of aqueous $NH_4OH$ solution with concentration of ammonium hydroxide of 10%. The fast basification caused the inclusion of more Cu and Fe ions in $(Cu^{2+}_xFe^{2+}_{1-x})(Fe^{3+}_yAl^{3+}_{1-y})_2O_4$ spinel phase with x=0.72 and y=0.71. Correspondingly, no $Fe_2O_3$ hematite phase was formed after calcination at 450° C. The material had the following weight ratio of metal components (EDAX): Fe:Al:K:Cu=100:15:5:6, surface area 138 m$^2$/gram, pore volume 0.20 cm$^3$/gram and average pore diameter 4.3 nm.

Example 3 (Comparative)

Preparation of a Catalyst Consisting of Hematite Phase [$Fe_2O_3$] and Spinel Phase of the Formula [$Fe^{2+}(Fe^{3+}_yAl^{3+}_{1-y})_2O_4$]; (y=0.40)]

The catalyst was prepared according to the procedure described in Example 1 but without any addition of $Cu(NO_3)_2$ salt to the mixed solution of metal nitrates. The material has following weight ratio of metal components (EDAX): Fe:Al:K=100:15:6, surface area 107 m$^2$/gram, pore volume 0.20 cm$^3$/gram and average pore diameter 3.4 nm. The material contained two phases (XRD): 41 wt % of hematite $Fe_2O_3$ and 59 wt % of phase with spinel structure which composition reflects partial isomorphous substitution of $Fe^{3+}$ ions with $Al^{3+}$ ions, such that the spinel phase of the catalyst is represented by the following formula:

$[Fe^{2+}(Fe^{3+}_yAl^{3+}_{1-y})_2O_4]$ where y=0.40.

Example 4

Preparation of a Catalyst Consisting of Hematite Phase [$Fe_2O_3$] and Spinel Phase of the Formula [$Fe^{2+}(Fe^{3+}_yAl^{3+}_{1-y})_2O_4$] (y=0.64)]

The catalyst was prepared according to the procedure described in Example 1, but without any addition of $Cu(NO_3)_2.3H_2O$ salt to the mixed solution of metal nitrates. In this example 94 gram of $Fe(NO_3)_3.9H_2O$ salt was used for preparation of iron salt solution in 50 cm$^3$ water and for adjustment of the pH value to 6.8, 535 cm³ of 3% NH₄OH aqueous solution were added to the metal salt solution. The resultant material has the following weight ratio of metal components (EDAX): Fe:Al:K=100:12:5, surface area 113 m²/gram, pore volume 0.21 cm³/gram and average pore diameter 4.9 nm. The material contained two phases (XRD): 45 wt % of hematite Fe₂O₃ and 55 wt % of phase with spinel structure whose composition reflects partial isomorphous substitution of $Fe^{3+}$ ions with $Al^{3+}$ ions, such that the spinel phase of the catalyst is represented by the formula:

$$[Fe^{2+}(Fe^{3+}{}_y Al^{3+}{}_{1-y})_2 O_4] \text{ where } y=0.64.$$

Example 5 (Comparative)

Preparation of a Catalyst Consisting of Hematite Phase [Fe₂O₃] and Spinel Phase of the Formula $[Fe^{2+}(Fe^{3+}{}_y Al^{3+}{}_{1-y})_2 O_4]$ (y=0.70)

The catalyst was prepared according to the procedure described in Example 1 but without the addition of Cu(NO₃)₂.3H₂O salt to the mixed solution of metal nitrates. In this example 115.7 gram of Fe(NO₃)₃.9H₂O salt was used for preparation of iron salt solution in 62 cm³ of water and for the adjustment of the pH value to 6.8 was added 570 cm³ of 3% NH₄OH aqueous solution. The material obtained has the following weight ratio of metal components (EDAX): Fe:Al:K=100:9:4, surface area 93 m²/gram, pore volume 0.21 cm³/gram and average pore diameter 6.5 nm. The material contained two phases (XRD): 86 wt % of hematite Fe₂O₃ and 14 wt % of phase with spinel structure whose composition reflects isomorphous substitution of $Fe^{3+}$ ions with $Al^{3+}$ ions, such that the spinel phase of the catalyst is represented by the formula $$[Fe^{2+}(Fe^{3+}{}_y Al^{3+}{}_{1-y})_2 O_4] \text{ where } y=0.70.$$

Example 6 (Comparative)

Preparation of a Catalyst Consisting of Iron Oxide Phases [Fe₂O₃; Fe₃O₄]

The procedure is according to U.S. Pat. No. 5,140,049.

Iron Oxide catalyst was obtained by combustion synthesis using glycolic acid as organic complexant. 12.6 gram of Glycolic acid were dissolved in 10% aqueous ammonia up to pH 6.5 and slowly added to a solution containing 67 gram of Fe(NO₃)₃.9 H₂O dissolved in 50 cm³ of water. Then the water, ammonia and part of NO₃⁻ ions converted to NO/NO₂ were removed from the mixed solution in rotavapor increasing the temperature from 40 to 80° C. up to complete drying of the material. The dried precipitate was calcined in air at 350° C. for 1 h (heating rate 5° C. min⁻¹). The formed iron oxide was impregnated by incipient wetness method with aqueous K₂CO₃ solution, followed by drying in air at 110° C. overnight. The material consisted on 35 wt % Hematite Fe₂O₃ and 65 wt % Magnetite Fe₃O₄. It had surface area of 110 m²/gram, pore volume 0.31 cm³/gram and average pore diameter 4.3 nm.

Example 7 (of the Invention)

Preparation of a Catalyst Consisting of Copper-Free Spinel Phase Only [Fe(Fe³⁺_y Al³⁺_{1-y})₂O₄; (y=0.47)]

The catalyst was prepared by co-precipitation from the aqueous solution of Fe and Al nitrates by gradual addition of aqueous ammonium hydroxide solution. 27.0 gram of Al(NO₃)₃.9H₂O and 57.9 gram of Fe(NO₃)₃.9H₂O were dissolved in 60 cm³ of distilled water each. The solutions were then mixed together and the pH value was adjusted to 8.0 by gradually adding 250 cm³ of aqueous NH₄OH solution with concentration of ammonium hydroxide of 5 wt %. The addition time was 15 minutes. The precipitate was recovered and impregnated with K₂CO₃ solution as described in Example 1. In the present example the atomic ratio of Fe:Al in the precipitating solution was 2:1. Correspondingly, no Fe₂O₃ hematite phase was formed after calcination at 450° C. The material had the following weight ratio of metal components (EDAX): Fe:Al:K=100:24:6, surface area 128 m²/gram, pore volume 0.53 cm³/gram and average pore diameter 3.5 nm.

Example 8 (of the Invention)

Preparation of a Catalyst Consisting of Copper-Free Spinel Phase Only [Fe(Fe³⁺_y Al³⁺_{1-y})₂O₄; (y=0.31)]

The catalyst was prepared by co-precipitation from the aqueous solution of Fe and Al nitrates by addition of aqueous ammonium hydroxide solution as described in Example 7. After mixing the aqueous solutions of Fe- and Al-salts the pH value was adjusted to 8.5 by gradually adding 265 cm³ of an aqueous NH₄OH solution (with concentration of 5 wt %). The addition time was 15 minutes. The precipitate was recovered and impregnated with K₂CO₃ solution as described in Example 1. The material consisted of only one—Al-substituted Fe₃O₄ spinel phase of formula Fe(Fe³⁺_{0.31}Al³⁺_{0.69})₂O₄ and had following weight ratio of metal components (EDAX): Fe:Al:K=100:42:6, surface area 118 m²/gram, pore volume 0.43 cm³/gram and average pore diameter 3.0 nm.

Example 9 (of the Invention)

Preparation of a Catalyst Consisting of Copper-Free Spinel Phase Only [Fe(Fe³⁺_y Al³⁺_{1-y})₂O₄; (y=0.71)]

The catalyst was prepared by co-precipitation from the aqueous solution of Fe and Al nitrates by addition of aqueous ammonium hydroxide solution as described in Example 7. After mixing the aqueous solutions of Fe- and Al-salts the pH value was adjusted to 7.2 by gradually adding 100 cm³ of aqueous NH₄OH solution with concentration of ammonium hydroxide of 5 wt %. The addition time was 15 minutes and the precipitate was recovered and impregnated with K₂CO₃ solution as described in Example 1. The material consisted of only one—Al-substituted Fe₂O₄ spinel phase of formula Fe(Fe³⁺_{0.71}Al³⁺_{0.29})₂O₄ and had following weight ratio of metal components (EDAX): Fe:Al:K=100:12:6, surface area 103 m²/gram, pore volume 0.38 cm³/gram and average pore diameter 3.7 nm.

Example 10 (Comparative)

Preparation of a Catalyst Consisting on Iron, Copper and Potassium Deposited on Al₂O₃ Support (According to WO 97/05088, WO 01/34538 A1, U.S. Pat. No. 4,555,526). To 36 gram of Fe(NO₃)₃.9H₂O, 1.25 gram of Cu(NO₃)₂.3H₂O and 3 gram of K₂CO3 dissolved in 100 cm³ of distilled water was added 20 gram of a powder of γ-Al₂O₃ with surface area of 180 m²/gram. The mixture was vigorously stirred and heated at 80° C. to evaporate water.

After evaporation of water, the solid reaction mixture was dried at 120° C. in air for 24 hours and calcined at 450° C. for 6 hours. The obtained catalyst had following weight ratio of metal components (EDAX): Fe:Cu:Al:K=100:6:21:0.34, surface area 76 m$^2$/gram, pore volume 0.16 cm$^3$/gram and average pore diameter 8.2 nm.

The compositions of the catalysts of Examples 1 to 10 are tabulated in Table A.

TABLE A

| catalyst | Hematite phase Fe$_2$O$_3$ | Spinel phase (Cu$^{2+}_x$Fe$^{2+}_{1-x}$)(Fe$^{3+}_y$Al$^{3+}_{1-y}$)$_2$O$_4$ |
|---|---|---|
| 1 comparative | 30% wt % | 70% wt % x = 0.54, y = 0.65 |
| 2 comparative | 0% | 100 wt % x = 0.72, y = 0.71 |
| 3 comparative | 41% (wt %) | 59% (wt %) x = 0.00, y = 0.40 |
| 4 comparative | 45% (wt %) | 55% (wt %) x = 0.00, y = 0.64 |
| 5 comparative | 86% (wt %) | 14% (wt %) x = 0.00, y = 0.70 |
| 6 comparative | 20% (wt %) Fe$_3$O$_4$ 80% (wt %) | |
| 7 of the invention | 0% | 100 wt % x = 0.0; y = 0.47 |
| 8 of the invention | 0% | 100 wt % x = 0.0; y = 0.31 |
| 9 of the invention | 0% | 100 wt % x = 0.0; y = 0.71 |
| 10 comparative | | Fe—Cu—K/Al2O3 |

In the next set of examples (Examples 11-22), the catalysts of Examples 1-10 were tested for their activity and selectivity in CO$_2$ hydrogenation reaction to form fuel compositions. Catalysts testing included catalyst activation, reaction and products analysis.

Catalysts activation was done by means of two methods: reduction in hydrogen at 100 cm$^3$/min*gram$_{cat}$, temperature 450° C., atmospheric pressure for 24 h; and carburization in a mixture of carbon monoxide and hydrogen in helium at flows 30:30:140 cm$^3$/min*gram$_{cat}$ respectively, at temperature 300° C., atmospheric pressure for 3 h.

CO$_2$ hydrogenation reaction was conducted by passing a mixture of H$_2$ and CO$_2$ flows at ratio 4:1 through the 3 gram of catalyst mixed with 1.8 gram of inert silica packed in a tubular reactor (11 mm ID and 210 mm long, 45 mm catalytic phase) and heated up to 300° C. or 320° C. at the total pressure of 10 atm. The reaction products were cooled down to +4° C. and separated in cooled (+4° C.) container. Gas products were analyzed in online Agilent 7890A Series Gas Chromatograph equipped with 7 columns and 5 automatic valves using helium as a carrier gas. Liquid products were separated into aqueous and organic phases. Aqueous phase was analyzed for Total Organic Carbon in Shimadzu TOC-V$_{CPN}$ Analyzer. The liquid organic phase composition was analyzed by Agilent 190915-433 Gas Chromatograph combined with Mass Spectrometer in the range M/Z=33-500, equipped with 5973 mass selective detector, HP-5MS column (30 m, 250 μm, i.d. 0.25 μm) and helium as a carrier gas. The distillation patterns of hydrocarbon oil were estimated by simulated distillation method based on the maximal boiling points of components in 10 vol % oil fractions. The oil productivity was calculated based on the weighted amounts of organic liquid (W$_{oil}$) collected over a specific period of time on stream: OP=W$_{oil}$/W$_{cat}$/RT gram/gram catalyst/h, where W$_{cat}$ is weight of catalyst (gram) loaded to reactor, RT-time period on stream (hours). The selectivity to CO, CH$_4$, C$_2$-C$_5$ and C$_6$+ hydrocarbons was calculated on the carbon basis as $S_i=[C_4/(C_{CO2}*X_{CO2})]*100\%$, where C$_i$ amount of carbon (gram) contained in product (i) produced at period of time, C$_{CO2}$—amount of carbon (gram) contained in CO$_2$ passed the reactor at the same period of time, X$_{CO2}$—CO$_2$ conversion. In the tables below, the following abbreviations are used: Con for conversion, Sel for selectivity and Pro for productivity.

Example 11

Carbon Dioxide Hydrogenation in One Fixed Bed Reactor

The Catalyst of Example 1 was packed in a fixed bed reactor and activated by H$_2$ reduction as described above. The effect of WHSV on the reaction products was determined. The results are shown in Table 1. Increasing of the space time by decreasing of WHSV of CO$_2$ did not increase the CO$_2$ conversion beyond 60%.

TABLE 1

| | | | | C$_2$-C$_5$ | | C$_{6+}$ oil | |
|---|---|---|---|---|---|---|---|
| CO$_2$ WHSV h$^{-1}$ | CO$_2$ Con., % | Methane Sel. % | CO Sel. % | Sel. % | Pro. (g/g$_{cat}$· h) · 10$^2$ | Sel. % | Pro. (g/g$_{cat}$· h) · 10$^2$ |
| 2 | 36 | 9 | 13 | 44 | 11.3 | 25 | 6.4 |
| 1 | 46 | 9 | 9 | 42 | 6.3 | 29 | 4.3 |
| 0.5 | 52 | 9 | 7 | 46 | 4.3 | 30 | 2.8 |
| 0.2 | 59 | 9 | 5 | 44 | 1.9 | 35 | 1.5 |
| 0.1 | 60 | 9 | 4 | 35 | 0.7 | 29 | 0.6 |

Example 12

Carbon Dioxide Hydrogenation in One Fixed Bed Reactor

The catalyst of Example 1 was packed in a fixed bed reactor and activated by carburization as described above. The effect of WHSV upon the reaction products was determined. The results are shown in Table 2. Comparison of the results presented in Tables 1 and 2 indicates a significantly higher activity of the catalyst after carburization compared with its activation by hydrogen reduction. Higher CO$_2$ conversions and oil productivities were measured at different WHSV with carburized catalyst.

TABLE 2

| | | | | C$_2$-C$_5$ | | C$_{6+}$ oil | |
|---|---|---|---|---|---|---|---|
| CO$_2$ WHSV h$^{-1}$ | CO$_2$ Con., % | Methane Sel. % | CO Sel. % | Sel. % | Pro. (g/g$_{cat}$· h) · 10$^2$ | Sel. % | Pro. (g/g$_{cat}$· h) · 10$^2$ |
| 6 | 40 | 10 | 12 | 38 | 32.2 | 29 | 24.6 |
| 3 | 46 | 11 | 7 | 41 | 20.1 | 26 | 12.5 |
| 1 | 53 | 8 | 5 | 15 | 10.9 | 19 | 3.5 |

Reaction conditions: Temperature 300° C., Total pressure 10 atm, H$_2$/CO$_2$=4 mol/mol.

Example 13

Carbon Dioxide Hydrogenation in One Fixed Bed Reactor

Catalyst prepared as described in Example 3 was packed in a fixed bed reactor and activated by carburization as described above. The effects of WHSV on the reaction products were determined. The results are shown in Table 3.

TABLE 3

| $CO_2$ WHSV $h^{-1}$ | $CO_2$ Con., % | Methane Sel. % | CO Sel. % | $C_2$-$C_5$ Sel. % | $C_2$-$C_5$ Pro. (g/g$_{cat}$·h)·$10^2$ | $C_{6+}$ oil Sel. % | $C_{6+}$ oil Pro. (g/g$_{cat}$·h)·$10^2$ |
|---|---|---|---|---|---|---|---|
| 1 | 52 | 9 | 10 | 45 | 8.3 | 25 | 4.7 |
| 6 | 41 | 10 | 20 | 44 | 36.3 | 15 | 12.3 |

Reaction conditions: Temperature 300° C., Total pressure 10 atm, $H_2/CO_2=4$.

Example 14

Carbon Dioxide Hydrogenation in One Fixed Bed Reactor

Catalyst prepared as described in Example 4 was packed in a fixed bed reactor and activated by carburization as described above. Effects of WHSV upon the reaction products were determined. The results are shown in Table 4.

TABLE 4

| $CO_2$ WHSV $h^{-1}$ | $CO_2$ Con., % | Methane Sel. % | CO Sel. % | $C_2$-$C_5$ Sel. % | $C_2$-$C_5$ Pro. (g/g$_{cat}$·h)·$10^2$ | $C_{6+}$ oil Sel. % | $C_{6+}$ oil Pro. (g/g$_{cat}$·h)·$10^2$ |
|---|---|---|---|---|---|---|---|
| 1 | 53 | 9 | 6 | 46 | 8.5 | 24 | 4.5 |
| 6 | 33 | 6 | 31 | 41 | 27.4 | 15 | 9.8 |

Reaction conditions: T=300° C., P=10 atm, $H_2/CO_2=4$.

Example 15

Carbon Dioxide Hydrogenation in One Fixed Bed Reactor

Catalyst prepared as described in Example 5 was packed in a fixed bed reactor and activated by carburization as described above. The effects of WHSV on the reaction products were determined. The results are shown in Table 5.

TABLE 5

| $CO_2$ WHSV $h^{-1}$ | $CO_2$ Con., % | Methane Sel. % | CO Sel. % | $C_2$-$C_5$ Sel. % | $C_2$-$C_5$ Pro. (g/g$_{cat}$·h)·$10^2$ | $C_{6+}$ oil Sel. % | $C_{6+}$ oil Pro. (g/g$_{cat}$·h)·$10^2$ |
|---|---|---|---|---|---|---|---|
| 1 | 37 | 8 | 14 | 50 | 6.6 | 20 | 3.5 |
| 6 | 20 | 7 | 83 | 1 | 0.2 | 3 | 1.0 |

Reaction conditions: T=300° C., P=10 atm, $H_2/CO_2=4$.

Example 16

Carbon Dioxide Hydrogenation in One Fixed Bed Reactor in the Presence of a Catalyst Consisting of Spinel Phase Only (Cu-Free)

Catalyst prepared as described in Example 7 was packed in a fixed bed reactor and activated by carburization as described above. The effect of WHSV upon the reaction products was determined. The results are shown in Table 6.

TABLE 6

| $CO_2$ WHSV $h^{-1}$ | $CO_2$ Con., % | Methane Sel. % | CO Sel. % | $C_2$-$C_5$ Sel. % | $C_2$-$C_5$ Pro. (g/g$_{cat}$·h)·$10^2$ | $C_{6+}$ oil Sel. % | $C_{6+}$ oil Pro. (g/g$_{cat}$·h)·$10^2$ |
|---|---|---|---|---|---|---|---|
| 1 | 52 | 12 | 6 | 39 | 7.9 | 29 | 5.8 |
| 6 | 45 | 12 | 13 | 27 | 26 | 40 | 38.5 |

Reaction conditions: T=300° C., Total pressure 10 atm, $H_2/CO_2=4$.

The selectivities to $C_{6+}$ hydrocarbons and oil productivity obtained with this catalyst of the present invention are significantly higher compared to that measured with carburized K/FeO$_x$ or biphasic K/Cu—Fe—Al—O—Fe$_2$O$_3$, K/Fe—Al—O—Fe$_2$O$_3$ catalysts.

Example 17

Carbon Dioxide Hydrogenation in One Fixed Bed Reactor in the Presence of a Catalyst Consisting of Spinel Phase Only (Containing Cu)

Catalyst prepared as described in Example 2 was packed in a fixed bed reactor and activated by $H_2$. The effect of WHSV upon the reaction products was determined. The results are shown in Table 7.

TABLE 7

| $CO_2$ WHSV $h^{-1}$ | $CO_2$ Con., % | Methane Sel. % | CO Sel. % | $C_2$-$C_5$ Sel. % | $C_2$-$C_5$ Pro. (g/g$_{cat}$·h)·$10^2$ | $C_{6+}$ oil Sel. % | $C_{6+}$ oil Pro. (g/g$_{cat}$·h)·$10^2$ |
|---|---|---|---|---|---|---|---|
| 1 | 35 | 9 | 28 | 39 | 4.9 | 16 | 2.0 |
| 6 | 23 | 8 | 39 | 46 | 22.6 | 6 | 2.9 |

Reaction conditions: T=300° C., Total pressure 10 atm, $H_2/CO_2=4$.

Example 18

Testing in One Fixed Bed Reactor of a Catalyst Consisting of Iron Oxide Phases [Fe$_2$O$_3$; Fe$_3$O$_4$] and not Containing Spinel Phase The catalyst prepared according to Example 6 was packed in the tubular reactor and activated by carburization as described above. The testing results are shown in Table 8.

TABLE 8

| $CO_2$ Con., % | Methane Sel. % | CO Sel. % | $C_2$-$C_5$ Sel. % | $C_2$-$C_5$ Pro. (g/g$_{cat}$·h)·$10^2$ | $C_{6+}$ oil Sel. % | $C_{6+}$ oil Pro. (g/g$_{cat}$·h)·$10^2$ |
|---|---|---|---|---|---|---|
| 39 | 8 | 16 | 46 | 5.9 | 21 | 2.7 |

Reaction conditions: 300° C., 10 atm, $H_2/CO_2=4$, WHSV=1.0 $h^{-1}$

Example 19

Carbon Dioxide Hydrogenation in One Fixed Bed Reactor

The catalyst prepared according to Example 9 was packed in the tubular reactor and activated by hydrogen reduction as described above. The testing results are shown in Table 9.

TABLE 9

| $CO_2$ Con., % | Methane Sel. % | CO Sel. % | $C_2$-$C_5$ | | $C_{6+}$ oil | |
|---|---|---|---|---|---|---|
| | | | Sel. % | Pro. $(g/g_{cat} \cdot h) \cdot 10^2$ | Sel. % | Pro. $(g/g_{cat} \cdot h) \cdot 10^2$ |
| 27 | 10 | 28 | 48 | 4.6 | 11 | 1.1 |

Reaction conditions: Temperature 300° C., total pressure 10 atm, $H_2/CO_2=4$, WHSV=1 $h^{-1}$.

Example 20

Carbon Dioxide Hydrogenation in One Fixed Bed Reactor

The catalyst prepared according to Example 8 was packed in the tubular reactor and activated by carburization as described above. The testing results are shown in Table 10.

TABLE 10

| $CO_2$ WHSV $h^{-1}$ | $CO_2$ Con., % | Methane Sel. % | CO Sel. % | $C_2$-$C_5$ | | $C_{6+}$ oil | |
|---|---|---|---|---|---|---|---|
| | | | | Sel. % | Pro. $(g/g_{cat} \cdot h) \cdot 10^2$ | Sel. % | Pro. $(g/g_{cat} \cdot h) \cdot 10^2$ |
| 1 | 52 | 13 | 6 | 41 | 7.6 | 27 | 5.0 |

Reaction conditions: Temperature 300° C., total pressure 10 atm, $H_2/CO_2=4$, WHSV=1 $h^{-1}$.

Example 21

Carbon Dioxide Hydrogenation in One Fixed Bed Reactor

The catalyst prepared according to Example 9 was packed in the tubular reactor and activated by carburization as described above. The testing results are shown in Table 11.

TABLE 11

| $CO_2$ WHSV $h^{-1}$ | $CO_2$ Con., % | Methane Sel. % | CO Sel. % | $C_2$-$C_5$ | | $C_{6+}$ oil | |
|---|---|---|---|---|---|---|---|
| | | | | Sel. % | Pro. $(g/g_{cat} \cdot h) \cdot 10^2$ | Sel. % | Pro. $(g/g_{cat} \cdot h) \cdot 10^2$ |
| 1 | 53 | 13 | 7 | 40 | 7.6 | 28 | 5.3 |

Reaction conditions: Temperature 300° C., total pressure 10 atm, $H_2/CO_2=4$, WHSV=1 $h^{-1}$.

Example 22

Carbon Dioxide Hydrogenation in One Fixed Bed Reactor

The catalyst prepared according to Example 10 was packed in the tubular reactor and activated by hydrogen reduction as described above. The testing results are shown in Table 12.

TABLE 12

| $CO_2$ Con., % | Methane Sel. % | CO Sel. % | $C_2$-$C_5$ | | $C_{6+}$ oil | |
|---|---|---|---|---|---|---|
| | | | Sel. % | Pro. $(g/g_{cat} \cdot h) \cdot 10^2$ | Sel. % | Pro. $(g/g_{cat} \cdot h) \cdot 10^2$ |
| 38 | 8 | 15 | 58 | 7.9 | 8.6 | 1.2 |

Reaction conditions: Temperature 300° C., total pressure 10 atm, $H_2/CO_2=4$, WHSV=1 $h^{-1}$.

$CO_2$ conversion levels achieved by the catalysts of Examples 1-10, when operating under the following set of experimental conditions: Temperature 300° C., total pressure 10 atm, $H_2/CO_2=4$, $WHSV_{CO2}=1$ $h^{-1}$, as reported in Examples 11-22, are tabulated in Table B.

TABLE B

| catalyst | CO2 conversion % |
|---|---|
| 1 | 53 |
| 2 | 35 |
| 3 | 52 |
| 4 | 53 |
| 5 | 37 |
| 6 | 39 |
| 7 | 52 |
| 8 | 52 |
| 9 | 53 |
| 10 | 40 |

In the next set of examples (Examples 23-27), some of the catalysts demonstrating $CO_2$ conversion of slightly more than 50% according to the data tabulated in Table B (i.e., the catalysts of Examples 1, 3, 4 and 7) were tested in an experimental set-up consisting of three reactors positioned in series, with water removal taking place between each pair of consecutive reactors, i.e., between the first and second reactors, and between the second and third reactors.

Example 23

Carbon Dioxide Hydrogenation in Three Reactors in Series 6 gram of the catalyst prepared as described in Example 1 was packed in three fixed bed reactors in series. 2 gram of catalyst was packed in each reactor and activated by carburization as described above. The testing system consisted of 3 consecutive SS fixed bed reactors with pressure, temperature and flow controls (shown in FIG. 4). After each reactor the heavy organic products (oil) and water were condensed in a cooling system and collected in the tank. After separation of liquid products, the gases containing non-reacted $CO_2$, $H_2$ and light Hydrocarbons, $C_1$-$C_5$ proceeded to flow to the next reactor. After each reactor the gas and liquid products were analyzed as described above. All the three reactors were kept at the same temperature and total pressure of 10 atm.

The catalyst performance as a function of temperature, $H_2:CO_2$ molar ratio and the number of reactors (N) in the testing system is listed in Table 13.

TABLE 13

| N | T °C. | $H_2:CO_2$ | $CO_2$ WHSV $h^{-1}$ | $CO_2$ Con. % | $CH_4$ Sel. % | CO Sel. % | $C_2$-$C_5$ Sel. % | $C_2$-$C_5$ Pro. $(g/g_{cat} \cdot h) \cdot 10^2$ | $C_{6+}$ oil Sel. % | $C_{6+}$ oil Pro. $(g/g_{cat} \cdot h) \cdot 10^2$ |
|---|---|---|---|---|---|---|---|---|---|---|
| 1 | 300 | 4:1 | 6 | 40 | 12 | 11 | 35 | 26.6 | 31 | 23.2 |
| 2 | 300 | 4:1 | 3 | 62 | 12 | 5 | 40 | 23.4 | 33 | 19.3 |
| 3 | 300 | 4:1 | 2 | 77 | 12 | 2 | 42 | 34.2 | 34 | 17.6 |
| 3 | 320 | 3:1 | 2 | 72 | 9 | 3 | 32 | 37.8 | 38 | 18.1 |
| 3 | 320 | 4:1 | 2 | 90 | 12 | 1 | 44 | 34.0 | 34 | 19.0 |
| 3 | 320 | 6:1 | 2 | 93 | 18 | 1 | 47 | 26.7 | 27 | 16.2 |

Example 24

Carbon Dioxide Hydrogenation in Three Reactors in Series 6 gram of catalyst prepared as described in Example 3 was packed in three fixed bed reactors in series as set out in Example 23. The aqueous and liquid hydrocarbons phases were separated from light gases between first and second and between second and third reactors as shown in FIG. 4. The catalyst in all three reactors was activated by carburization as described above and tested as in Example 23. The effects of temperature and total pressure upon the reaction products were determined. The results are shown in Table 14. The oil hydrocarbon composition was similar to that obtained for oil collected in Example 23.

TABLE 14

| N | T, °C. | P, atm | $CO_2$, WHSV $h^{-1}$ | $CO_2$ Con. % | $CH_4$ Sel. % | CO Sel. % | $C_2$-$C_5$ Sel. % | $C_2$-$C_5$ Pro. $(g/g_{cat} \cdot h) \cdot 10^2$ | $C_{6+}$ oil Sel. % | $C_{6+}$ oil Pro. $(g/g_{cat} \cdot h) \cdot 10^2$ |
|---|---|---|---|---|---|---|---|---|---|---|
| 1 | 300 | 10 | 6 | 41 | 10 | 20 | 44 | 36.3 | 15 | 12.3 |
| 3 | 300 | 10 | 2 | 79 | 10 | 4 | 42 | 21.8 | 33 | 17 |
| 3 | 320 | 10 | 2 | 84 | 11 | 2 | 38 | 21.2 | 37 | 20.7 |
| 3 | 320 | 15 | 2 | 86 | 12 | 2 | 30 | 16.6 | 43 | 24.0 |
| 3 | 320 | 5 | 2 | 62 | 9 | 30 | 40 | 16.7 | 16 | 6.9 |

Reaction conditions: $H_2/CO_2=4$.

Example 25

Carbon Dioxide Hydrogenation in Three Reactors in Series 6 gram of catalyst prepared as described in Example 6 was packed in three fixed bed reactors in series as set out in Example 23. The catalyst was activated by carburization as described above and tested as in Example 23. The effect of WHSV upon the reaction products was determined. The results are shown in Table 15. The oil hydrocarbon composition was similar to that obtained for oil collected in Example 23.

TABLE 15

| N | $CO_2$, WHSV $h^{-1}$ | $CO_2$ Con. % | $CH_4$ Sel. % | CO Sel. % | $C_2$-$C_5$ Sel. % | $C_2$-$C_5$ Pro. $(g/g_{cat} \cdot h) \cdot 10^2$ | $C_{6+}$ oil Sel. % | $C_{6+}$ oil Pro. $(g/g_{cat} \cdot h) \cdot 10^2$ |
|---|---|---|---|---|---|---|---|---|
| 3 | 1 | 70 | 10 | 10 | 34 | 7.8 | 28 | 6.5 |
| 3 | 2 | 57 | 8 | 20 | 39 | 14.0 | 26 | 10.6 |

Reaction conditions: T=300° C., $H_2/CO_2=4$, total pressure 10 atm.

Example 26

Carbon Dioxide Hydrogenation in Three Reactors in Series in the Presence of a Catalyst Consisting of Spinel Phase Only (Cu-Free Catalyst)

6 gram of catalyst prepared as described in Example 7 was packed in three fixed bed reactors in series as set out in Example 23. The aqueous and liquid hydrocarbons phases were separated from light gases between first and second and between second and third reactors as shown in the scheme of FIG. 4. The catalyst in all three reactors was activated by carburization as described above and tested as in Example 23. The effects of $WHSV_{CO2}$ upon the reaction products were determined. The results are shown in Table 16. The cascade reactors configuration with this catalyst of the present invention gives maximal $C_6+$ hydrocarbons selectivity and oil productivity about 0.5 kg/kg$_{cat}$ h.

TABLE 16

| N | T, °C. | P, atm | $CO_2$, WHSV $h^{-1}$ | $CO_2$ Con. % | $CH_4$ Sel. % | CO Sel. % | $C_2$-$C_5$ Sel. % | $C_2$-$C_5$ Pro. $(g/g_{cat} \cdot h) \cdot 10^2$ | $C_{6+}$ oil Sel. % | $C_{6+}$ oil Pro. $(g/g_{cat} \cdot h) \cdot 10^2$ |
|---|---|---|---|---|---|---|---|---|---|---|
| 1 | 320 | 10 | 2 | 54 | 10 | 11 | 36 | 12.3 | 32 | 10.9 |
| 3 | 320 | 10 | 2 | 89 | 13 | 4 | 30 | 18.8 | 47 | 29.6 |
| 3 | 320 | 10 | 6 | 81 | 15 | 7 | 35 | 44.9 | 38 | 59.2 |

Reaction conditions: T=320° C., Total pressure 10 atm, $H_2/CO_2$=4.

Example 27

Carbon Dioxide/Carbon Monoxide Hydrogenation in Three Reactors in Series 6 gram of catalyst prepared as described in Example 7 was packed in three fixed bed reactors in series with pressure, temperature and flow controls as set out in Example 23. 2 gram of the catalyst was packed in each reactor and activated by carburization as described above. The catalyst was tested in hydrogenation reaction of the mixture of $CO_2$ and CO by feeding a mixture of $H_2$, $CO_2$ and CO flows at molar ratio 5:1:1, respectively. After each reactor the heavy organic products (oil) and water were condensed in a cooling system and collected in the tank. After separation of liquid products, the gases containing non-reacted $CO_2$, CO and $H_2$ and light hydrocarbons flowed to the next reactor. The gas products were analyzed as described above after the third reactor. The liquids were collected from three reactors were mixed and analyzed as described above. All the three reactors were kept at the same temperature and total pressure. The oil productivity was calculated based on the weighted amounts of organic liquid ($W_{oil}$) collected per hour: OP=$W_{oil}/W_{cat}$/h, where $W_{cat}$ is total weight of loaded catalyst. The selectivity to $CH_4$, $C_2$-$C_5$ and $C_{6+}$ hydrocarbons was calculated on the carbon basis as $S_i$=[$C_i$/($C_{CO2+CO}*X_{Total}$)]*100%, where $C_i$ amount of carbon (gram) contained in product (i) produced at period of time, $C_{CO2+CO}$—amount of carbon (gram) contained in both $CO_2$ and CO that flowed through the reactor at the same period of time, $X_{Total}$—total conversion of C calculated as $C_{reacted}/C_{in}$ (weight fraction). The effect of pressure upon the reaction products was determined. The results are shown in Table 17.

Example 28

Carbon Dioxide Hydrogenation in Three Reactors in Series with Different Catalysts at $CO_2$ Conversion of 75% Adjusted by Varying of $WHSV_{CO2}$ In the set of experiments described in this Example, the performance (activity and selectivity) of the catalysts tabulated in Table B was measured under identical conditions (the same feed composition, temperature, pressure and $CO_2$ conversion). The latter variable is controlled by varying the space velocity. Using the three packed-bed-reactors-in-series system illustrated in FIG. 4, high $CO_2$ conversion (75%) was reached to reflect the selectivity to hydrocarbons.

Thus, 6 gram of catalysts prepared as described in Examples 1, 3, 4, 6, 7, 8 and 9 were packed in separate experiments in three fixed bed reactors in series as set out in Example 23. The catalysts were activated by carburization as described above. The results set out in Table 18 were measured for every catalyst after 200 h of run at 300° C., P=10 atm, $H_2/CO_2$=4 and properly adjusted $WHSV_{CO2}$ to produce total $CO_2$ conversion of 75%.

TABLE 17

| $CO_2$ WHSV $h^{-1}$ | CO WHSV $h^{-1}$ | $CO_2$ + CO WHSV $h^{-1}$ | P atm | $CO_2$ Con % | CO Con % | $CH_4$ Sel % | Total Con % | $C_2$-$C_5$ Sel % | $C_2$-$C_5$ Pro. $(g/g_{cat} \cdot h) \cdot 10^2$ | $C_{6+}$ oil Sel % | $C_{6+}$ oil Pro. $(g/g_{cat} \cdot h) \cdot 10^2$ |
|---|---|---|---|---|---|---|---|---|---|---|---|
| 1.0 | 0.6 | 1.6 | 10 | 55 | 97 | 13.4 | 73.2 | 52.4 | 22.1 | 29 | 12.3 |
| 1.0 | 0.6 | 1.6 | 15 | 66 | 98 | 14.1 | 80.0 | 50 | 23.1 | 30 | 13.9 |

Reaction conditions: T=320° C., $H_2/CO_2/CO$=5:1:1.

TABLE 18

| Catalyst | $WHSV_{CO2}$ $h^{-1}$ | Products selectivity, wt % | | | | | C5+ pro. $g/g_{cat} \cdot h \cdot 10^{-2}$ |
|---|---|---|---|---|---|---|---|
| | | $CH_4$ | CO | C2-C4 Olefins | C2-C4 paraffins | C2-C4 Oxygenates in water | C5+ | |
| 1 | 2.0 | 12 | 2 | 29 | 8 | 7 | 41 | 20.3 |
| 3 | 1.5 | 10 | 3 | 30 | 10 | 9 | 38 | 15.2 |
| 4 | 1.5 | 11 | 4 | 29 | 9 | 8 | 37 | 14.8 |
| 6 | 1.0 | 10 | 9 | 29 | 8 | 8 | 35 | 8.2 |
| 7 | 6.0 | 16 | 3 | 28 | 8 | 7 | 38 | 54.8 |
| 8 | 5.0 | 14 | 3 | 29 | 9 | 7 | 38 | 50.8 |
| 9 | 4.0 | 15 | 4 | 28 | 8 | 8 | 37 | 40.6 |

The results shown in Table 18 demonstrate that the catalysts consisting of pure phase of Al-substituted $Fe_3O_4$ with spinel structure, i.e., the catalysts represented by Formula 1 $Fe^{2+}(Fe^{3+}_y Al^{3+}_{1-y})_2O_4$; (y=0.05-0.95, preferably y=0.25-0.75 and more preferably y=0.30-0.70), i.e., catalysts of Examples 7, 8 and 9, display higher catalytic activity in conversion of $CO_2$ to hydrocarbons compared with the catalysts of Examples 1, 3, 4 and 6.

Example 29

Preparation of Extruded Catalyst Consisting of Spinel Phase Only [$Fe(Fe^{3+}_y Al^{3+}_{1-y})_2O_4$; (x=0.00, y=0.47)]

$Fe(Fe^{3+}_y Al^{3+}_{1-y})_2O_4$ from Example 7 was formed as extrudates with cylindrical shape using $Al_2O_3$ as a binder. 11.73 gram of $Fe(Fe^{3+}_y Al^{3+}_{1-y})_2O_4$ prepared in Example 7 was mixed with 4.89 gram of AlOOH powder (Disperal P2, Sasol Ltd., Germany) and water was added to get a slurry. The slurry was kneaded in a mortar and extruded using a matrix with 1.2 mm cylindrical shape opening. The extrudates were dried at room temperature for 24 h, then at 110° C. overnight and calcined at 450° C. for period of 2 h (temperature increasing rate 5° C./min). The so-formed material was impregnated by incipient wetness with aqueous solution containing 2.15 gram $K_2CO_3$. The impregnated material was dried in air at 110° C. for period of 24 h and calcined in air at 450° C. for period of 2 h (temperature increasing rate 5° C./min).

Example 30

Preparation of a Catalyst $K/Fe^{2+}(Fe^{3+}_y Al^{3+}_{1-y})_2O_4$ (y=0.47) in the Form of Binder-Free Granules The powder product of Example 7 was loaded into a round template with inner diameter of 4 cm. A load of 20 tons was applied twice on the sample. The so-formed binder-free pellet was crushed and a faction consisting of granules with size in the range from 1.4 to 1.7 mm was collected by sieving.

Example 31

Carbon Dioxide Hydrogenation in Three Reactors in Series 15 gram of the catalyst of Example 30 in the form of pellets with sizes in the range of 1.4-1.7 mm were packed in three 16 mm ID and 300 mm long fixed bed reactors equipped with 2.3 mm ID thermowells and arranged in series as illustrated in FIG. 4. Each reactor contained 5 gram of catalyst diluted with 15 gram of silica. The total pressure at the inlet was 30 atm and pressure drop in the system of less than 0.5 atm. The feedstock consisted of $H_2$ and $CO_2$ at a molar ratio of 2.9 and WHSV of $CO_2$ was 0.7. The temperature profile in each reactor is given in Table 19. The performance is set out in Table 20.

TABLE 19

| Position in the reactor (cm) | First reactor | Second reactor | Third reactor |
|---|---|---|---|
| | | Temperature | |
| 0 | 326 | 324 | 323 |
| 1 | 334 | 325 | 325 |
| 2 | 338 | 325 | 325 |
| 3 | 336 | 326 | 323 |
| 4 | 330 | 325 | 322 |
| 5 | 327 | 324 | 321 |
| 6 | 325 | 323 | 320 |
| 7 | 324 | 322 | 319 |
| 8 | 322 | 320 | 317 |

TABLE 20

| $X_{CO2}$ | $X_{H2}$ | $S_{C5+}$ | $S_{C7+}$ | $S_{Methane}$ | $S_{Ethylene}$ | $S_{CO}$ | $S_{C3-C4\,olefins}$ | $S_{C2-C4\,paraffins}$ | $S_{oxygenates}$ |
|---|---|---|---|---|---|---|---|---|---|
| 76.6 | 84.7 | 57.9 | 53.9 | 8.8 | 4.1 | 1.6 | 13.4 | 5.2 | 9.1 |

Example 32

Carbon Dioxide/Carbon Monoxide Hydrogenation in Three Reactors in Series 3 grams of the catalyst of Example 7 in a powder form were packed in three 11 mm ID and 150 mm long fixed bed reactors equipped with 2.3 mm ID thermowells and arranged in series as illustrated in FIG. 4. Each reactor contained 1 gram of catalyst diluted with 3 gram of silica. The total inlet pressure was 20 atm and pressure drop in the system of less than 0.5 atm, the feedstock consisted of $CO_2$, CO and $H_2$ at a molar ratio of 1:1:4.8 and WHSV of $CO_2$ and CO combined of 2 $h^{-1}$. The temperature profile in each reactor is given in Table 21. The performance is set out in Table 22.

TABLE 21

| Position in the reactor (cm) | First reactor | Second reactor Temperature | Third reactor |
|---|---|---|---|
| 0 | 306 | 313 | 312 |
| 0.5 | 312 | 322 | 319 |
| 1.0 | 315 | 330 | 325 |
| 1.5 | 318 | 332 | 327 |
| 2.0 | 322 | 333 | 328 |
| 2.5 | 324 | 331 | 327 |
| 3.0 | 327 | 329 | 325 |
| 3.5 | 329 | 324 | 320 |

TABLE 22

| $X_{CO2}$ | $X_{CO}$ | $X_{H2}$ | $S_{C5+}$ | $S_{C7+}$ | $S_{Methane}$ | $S_{Ethylene}$ | $S_{CO}$ | $S_{C3-C4\ olefins}$ | $S_{C2-C4\ paraffins}$ | $S_{oxygenates}$ |
|---|---|---|---|---|---|---|---|---|---|---|
| 41.8 | 95.5 | 75.2 | 50.6 | 46.0 | 11.5 | 4.1 | 4.0 | 16.7 | 9.7 | 7.2 |

Example 33

Carbon Dioxide/Carbon Monoxide Hydrogenation in Three Reactors in Series 3 grams of the catalyst of Example 7 in a powder form were packed in three 11 mm ID and 150 mm long fixed bed reactors equipped with 2.3 mm ID thermowells and arranged in series as illustrated in FIG. 4. Each reactor contained 1 gram of catalyst diluted with 3 gram of silica. The total inlet pressure was 20 atm and pressure drop in the system of less than 0.5 atm, the feedstock consisted of $CO_2$, CO and $H_2$ at a molar ratio of 1:0.7:4.1 and WHSV of $CO_2$ and CO combined of 0.9 $h^{-1}$. The temperature profile in each reactor is given in Table 23. The performance is set out in Table 24.

TABLE 23

| Position in the reactor (cm) | First reactor | Second reactor Temperature | Third reactor |
|---|---|---|---|
| 0 | 308 | 321 | 321 |
| 0.5 | 313 | 328 | 328 |
| 1.0 | 317 | 334 | 333 |
| 1.5 | 320 | 338 | 335 |
| 2.0 | 322 | 339 | 336 |
| 2.5 | 323 | 339 | 336 |
| 3.0 | 324 | 338 | 334 |
| 3.5 | 324 | 334 | 331 |

TABLE 24

| $X_{CO2}$ | $X_{CO}$ | $X_{H2}$ | $S_{C5+}$ | $S_{C7+}$ | $S_{Methane}$ | $S_{Ethylene}$ | $S_{CO}$ | $S_{C3-C4\ olefins}$ | $S_{C2-C4\ paraffins}$ | $S_{oxygenates}$ |
|---|---|---|---|---|---|---|---|---|---|---|
| 56.3 | 95.9 | 81.8 | 62.4 | 59.7 | 8.8 | 1.7 | 1.8 | 10.3 | 10.6 | 6.1 |

The invention claimed is:

1. A catalyst suitable for use in the hydrogenation of carbon dioxide-containing gas, said catalyst comprising spinel phase of the following formula:

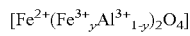

Formula 1 wherein y is from 0.25 to 0.75, having surface area of not less than 80 m²/gram, and wherein the catalyst is copper-free and is devoid of hematite phase, metallic iron, $Fe_3O_4$ and Fe-carbide, wherein the catalyst further comprises potassium on its surface.

2. A catalyst according to claim 1, wherein y is from 0.3 to 0.7.

3. A catalyst according to claim 1, wherein the spinel of Formula 1 has average crystal size in the range from 1.5 to 3 nm, as measured by X-Ray diffraction (XRD).

4. A catalyst according to claim 1, having surface area between 80 m²/g and 180 m²/g.

* * * * *